(12) United States Patent
Nomura et al.

(10) Patent No.: US 11,397,476 B2
(45) Date of Patent: Jul. 26, 2022

(54) SENSOR SYSTEM

(71) Applicant: Wacom Co., Ltd., Saitama (JP)

(72) Inventors: Yoshio Nomura, Saitama (JP); Yuhi Hatano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/114,352

(22) Filed: Dec. 7, 2020

(65) Prior Publication Data

US 2021/0223875 A1    Jul. 22, 2021

(30) Foreign Application Priority Data

Jan. 20, 2020  (JP) .............................. JP2020-007100

(51) Int. Cl.
  *G06F 3/0354* (2013.01)
  *G06F 3/038* (2013.01)
  *G06F 3/044* (2006.01)

(52) U.S. Cl.
  CPC ........ *G06F 3/03545* (2013.01); *G06F 3/0383* (2013.01); *G06F 3/044* (2013.01)

(58) Field of Classification Search
  CPC ..... G06F 3/03545; G06F 3/0383; G06F 3/044
  See application file for complete search history.

(56) References Cited

U.S. PATENT DOCUMENTS

| 2017/0003814 A1* | 1/2017 | Park ...................... G06F 3/0412 |
| 2019/0235646 A1 | 8/2019 | Karsuntsev et al. |
| 2021/0208696 A1* | 7/2021 | Suzuki ................ G06F 3/03545 |

FOREIGN PATENT DOCUMENTS

| EP | 0 982 678 A2 | 8/1999 |
| JP | 2000-99260 A | 4/2000 |
| JP | 2019-133487 A | 8/2019 |

OTHER PUBLICATIONS

Microsoft, "Windows Precision Touchpad Collection," URL: https://docs.microsoft.com/en-US/windows-hardware/design/component-guidelines/touchpad-windows-precision-touchpad-collection, May 2, 2017, 8 pages.

* cited by examiner

*Primary Examiner* — Peter D McLoone
(74) *Attorney, Agent, or Firm* — Seed IP Law Group LLP

(57) ABSTRACT

Disclosed herein is a sensor system that detects a stylus on at least one panel surface having an effective region. The sensor system includes a memory device including computer-executable instructions, and a processor. The processor, when loaded with the computer-executable instructions, performs: and obtaining a position of the stylus and a pen pressure value indicating a pressure applied to a pen tip of the stylus; outputting the position and the pen pressure value to a host processor. In response to the position being outside the effective region, the processor performs processing to conceal from the host processor occurrence of at least one of a pen-down indicating the stylus contacting the panel surface and a pen-up indicating the stylus being removed from the panel surface.

17 Claims, 30 Drawing Sheets

FIG. 8

| t | COORDINATES (x, y) | PEN PRESSURE VALUE P | REPORT CONTENTS | HOST PROCESSOR |
|---|---|---|---|---|
| $t_0$ | UNDETECTED | UNDETECTED | --- | --- |
| $t_1$ | $x_0 \leq x \leq x_1, y_0 \leq y \leq y_1$ | $P=0$ | --- | PEN-UP |
| $t_2$ | $x_0 \leq x \leq x_1, y_0 \leq y \leq y_1$ | $P=0$ | --- | PEN-UP |
| $t_3$ | $x_0 \leq x \leq x_1, y_0 \leq y \leq y_1$ | $P>0$ | PEN-DOWN | PEN-DOWN |
| $t_4$ | $x_0 \leq x \leq x_1, y_0 \leq y \leq y_1$ | $P>0$ | --- | PEN MOVEMENT |
| $t_5$ | $x_0 \leq x \leq x_1, y_0 \leq y \leq y_1$ | $P>0$ | --- | PEN MOVEMENT |
| $t_6$ | $x_1 < x \leq x_2, y_0 \leq y \leq y_1$ | $P>0$ | --- | PEN MOVEMENT |
| $t_7$ | $x_1 < x \leq x_2, y_0 \leq y \leq y_1$ | $P>0$ | --- | PEN MOVEMENT |
| $t_8$ | $x_1 < x \leq x_2, y_0 \leq y \leq y_1$ | $P>0$ | --- | PEN MOVEMENT |
| $t_9$ | $x_1 < x \leq x_2, y_0 \leq y \leq y_1$ | $P>0$ | --- | PEN MOVEMENT |
| $t_{10}$ | $x_1 < x \leq x_2, y_0 \leq y \leq y_1$ | $P>0$ | --- | PEN MOVEMENT |
| $t_{11}$ | $x_0 \leq x \leq x_1, y_0 \leq y \leq y_1$ | $P>0$ | --- | PEN MOVEMENT |
| $t_{12}$ | $x_0 \leq x \leq x_1, y_0 \leq y \leq y_1$ | $P>0$ | --- | PEN MOVEMENT |
| $t_{13}$ | $x_0 \leq x \leq x_1, y_0 \leq y \leq y_1$ | $P=0$ | --- | PEN-UP |
| $t_{14}$ | UNDETECTED | UNDETECTED | PEN-UP | (END) |

STYLUS APPROACHES PANEL SURFACE — $t_0$
PEN TIP COMES INTO CONTACT WITH PANEL SURFACE — $t_2$
PEN TIP MOVES TO REGION R2 — $t_5$
PEN TIP MOVES TO REGION R1 — $t_{10}$
PEN TIP IS SEPARATED FROM PANEL SURFACE — $t_{12}$
DISTANCE BETWEEN STYLUS AND PANEL SURFACE INCREASES — $t_{13}$

COMPARATIVE EXAMPLE 1-1

FIG. 9

| t | | COORDINATES (x, y) | PEN PRESSURE VALUE P | REPORT CONTENTS | | HOST PROCESSOR |
|---|---|---|---|---|---|---|
| $t_0$ | STYLUS APPROACHES PANEL SURFACE | UNDETECTED | UNDETECTED | -- | | -- |
| $t_1$ | | $x_0 \leq x \leq x_1, y_0 \leq y \leq y_1$ | P=0 | -- | | PEN-UP |
| $t_2$ | PEN TIP COMES INTO CONTACT WITH PANEL SURFACE | $x_0 \leq x \leq x_1, y_0 \leq y \leq y_1$ | P=0 | -- | LID,x,y,P | PEN-UP |
| $t_3$ | | $x_0 \leq x \leq x_1, y_0 \leq y \leq y_1$ | P>0 | PEN-DOWN | LID,x,y,P | PEN-DOWN |
| $t_4$ | | $x_0 \leq x \leq x_1, y_0 \leq y \leq y_1$ | P>0 | -- | LID,x,y,P | PEN MOVEMENT |
| $t_5$ | PEN TIP MOVES TO REGION R2 | $x_0 \leq x \leq x_1, y_0 \leq y \leq y_1$ | P>0 | -- | LID,x,y,P | PEN MOVEMENT |
| $t_6$ | | $x_1 < x \leq x_2, y_0 \leq y \leq y_1$ | P=0 | -- | LID,$x_1$,y,P | PEN MOVEMENT |
| $t_7$ | PEN TIP PASSES LEVEL DIFFERENCE 5d | $x_1 < x \leq x_2, y_0 \leq y \leq y_1$ | P=0 | -- | LID,$x_1$,y,P | PEN-UP |
| $t_8$ | | $x_1 < x \leq x_2, y_0 \leq y \leq y_1$ | P>>0 | -- | LID,$x_1$,y,P | PEN-UP |
| $t_9$ | | $x_1 < x \leq x_2, y_0 \leq y \leq y_1$ | P>0 | PEN-DOWN | LID,$x_1$,y,P | PEN-DOWN |
| $t_{10}$ | PEN TIP MOVES TO REGION R1 | $x_1 < x \leq x_2, y_0 \leq y \leq y_1$ | P>0 | -- | LID,$x_1$,y,P | PEN MOVEMENT |
| $t_{11}$ | | $x_0 \leq x \leq x_1, y_0 \leq y \leq y_1$ | P>0 | -- | LID,$x_1$,y,P | PEN MOVEMENT |
| $t_{12}$ | PEN TIP IS SEPARATED FROM PANEL SURFACE | $x_0 \leq x \leq x_1, y_0 \leq y \leq y_1$ | P>0 | -- | LID,x,y,P | PEN MOVEMENT |
| $t_{13}$ | | $x_0 \leq x \leq x_1, y_0 \leq y \leq y_1$ | P=0 | -- | LID,x,y,P | PEN-UP |
| $t_{14}$ | DISTANCE BETWEEN STYLUS AND PANEL SURFACE INCREASES | UNDETECTED | UNDETECTED | PEN-UP | | (END) |

COMPARATIVE EXAMPLE 1-2

F I G. 11

| t | COORDINATES (x, y) | PEN PRESSURE VALUE P | REPORT CONTENTS | | HOST PROCESSOR |
|---|---|---|---|---|---|
| $t_0$ | UNDETECTED | UNDETECTED | -- | -- | -- |
| $t_1$ | $x_0 \leq x \leq x_1, y_0 \leq y \leq y_1$ | $P=0$ | -- | $LID,x,y,P$ | PEN-UP |
| $t_2$ | $x_0 \leq x \leq x_1, y_0 \leq y \leq y_1$ | $P=0$ | -- | $LID,x,y,P$ | PEN-UP |
| $t_3$ | $x_0 \leq x \leq x_1, y_0 \leq y \leq y_1$ | $P>0$ | PEN-DOWN | $LID,x,y,P$ | PEN-DOWN |
| $t_4$ | $x_0 \leq x \leq x_1, y_0 \leq y \leq y_1$ | $P>0$ | -- | $LID,x,y,P$ | PEN MOVEMENT |
| $t_5$ | $x_0 \leq x \leq x_1, y_0 \leq y \leq y_1$ | $P>0$ | -- | $LID,x,y,P$ | PEN MOVEMENT |
| $t_6$ | $x_1 < x \leq x_2, y_0 \leq y \leq y_1$ | $P=0$ | -- | $LID,x,y,P$ | PEN-UP |
| $t_7$ | $x_1 < x \leq x_2, y_0 \leq y \leq y_1$ | $P=0$ | -- | $LID,x_1,y,0$ | PEN-UP |
| $t_8$ | $x_1 < x \leq x_2, y_0 \leq y \leq y_1$ | $P>>0$ | PEN-DOWN | $LID,x_1,y,0$ | PEN-UP |
| $t_9$ | $x_1 < x \leq x_2, y_0 \leq y \leq y_1$ | $P>0$ | -- | $LID,x_1,y,0$ | PEN-UP |
| $t_{10}$ | $x_0 \leq x \leq x_1, y_0 \leq y \leq y_1$ | $P>0$ | -- | $LID,x,y,P$ | PEN-DOWN |
| $t_{11}$ | $x_0 \leq x \leq x_1, y_0 \leq y \leq y_1$ | $P>0$ | -- | $LID,x,y,P$ | PEN MOVEMENT |
| $t_{12}$ | $x_0 \leq x \leq x_1, y_0 \leq y \leq y_1$ | $P=0$ | -- | $LID,x,y,P$ | PEN-UP |
| $t_{13}$ | UNDETECTED | UNDETECTED | PEN-UP | -- | (END) |
| $t_{14}$ | | | | | |

$t_0$ STYLUS APPROACHES PANEL SURFACE
$t_2$ PEN TIP COMES INTO CONTACT WITH PANEL SURFACE
$t_5$ PEN TIP MOVES TO REGION R2
$t_7$ PEN TIP PASSES LEVEL DIFFERENCE 5d
$t_{10}$ PEN TIP MOVES TO REGION R1
$t_{12}$ PEN TIP IS SEPARATED FROM PANEL SURFACE
$t_{13}$ DISTANCE BETWEEN STYLUS AND PANEL SURFACE INCREASES

EXAMPLE 1-1

FIG. 13

| | COORDINATES (x, y) | PEN PRESSURE VALUE P | REPORT CONTENTS | | HOST PROCESSOR |
|---|---|---|---|---|---|
| $t_0$ — STYLUS APPROACHES PANEL SURFACE | UNDETECTED | UNDETECTED | -- | | -- |
| $t_1$ — PEN TIP COMES INTO CONTACT WITH PANEL SURFACE | $x_0 \leq x \leq x_1, y_0 \leq y \leq y_1$ | $P=0$ | -- | $LID, x, y, P$ | PEN-UP |
| $t_2$ | $x_0 \leq x \leq x_1, y_0 \leq y \leq y_1$ | $P=0$ | -- | $LID, x, y, P$ | PEN-UP |
| $t_3$ | $x_0 \leq x \leq x_1, y_0 \leq y \leq y_1$ | $P>0$ | PEN-DOWN | $LID, x, y, P$ | PEN-DOWN |
| $t_4$ — PEN TIP MOVES TO REGION R2 | $x_0 \leq x \leq x_1, y_0 \leq y \leq y_1$ | $P>0$ | -- | $LID, x, y, P$ | PEN MOVEMENT |
| $t_5$ | $x_0 \leq x \leq x_2, y_0 \leq y \leq y_1$ | $P>0$ | -- | $LID, x, y, P$ | PEN MOVEMENT |
| $t_6$ — PEN TIP PASSES LEVEL DIFFERENCE 5d | $x_1 < x \leq x_2, y_0 \leq y \leq y_1$ | $P>0$ | -- | $LID, x_1, y, P$ | PEN MOVEMENT |
| $t_7$ | $x_1 < x \leq x_2, y_0 \leq y \leq y_1$ | $P=0$ | -- | -- | (STANDBY) |
| $t_8$ | $x_1 < x \leq x_2, y_0 \leq y \leq y_1$ | $P=0$ | -- | -- | (STANDBY) |
| $t_9$ | $x_1 < x \leq x_2, y_0 \leq y \leq y_1$ | $P>>0$ | PEN-DOWN | -- | (STANDBY) |
| $t_{10}$ — PEN TIP MOVES TO REGION R1 | $x_1 < x \leq x_2, y_0 \leq y \leq y_1$ | $P>0$ | -- | -- | (STANDBY) |
| $t_{11}$ | $x_0 \leq x \leq x_1, y_0 \leq y \leq y_1$ | $P>0$ | -- | $LID, x, y, P$ | PEN MOVEMENT |
| $t_{12}$ — PEN TIP IS SEPARATED FROM PANEL SURFACE | $x_0 \leq x \leq x_1, y_0 \leq y \leq y_1$ | $P>0$ | -- | $LID, x, y, P$ | PEN MOVEMENT |
| $t_{13}$ — DISTANCE BETWEEN STYLUS AND PANEL SURFACE INCREASES | $x_0 \leq x \leq x_1, y_0 \leq y \leq y_1$ | $P=0$ | -- | $LID, x, y, P$ | PEN-UP |
| $t_{14}$ | UNDETECTED | UNDETECTED | PEN-UP | -- | (END) |

EXAMPLE 1-2

EXAMPLE 1-3

FIG. 17

| | COORDINATES (x, y) | PEN PRESSURE VALUE P | REPORT CONTENTS | | HOST PROCESSOR |
|---|---|---|---|---|---|
| $t_0$ STYLUS APPROACHES PANEL SURFACE | UNDETECTED | UNDETECTED | -- | -- | -- |
| $t_1$ | $x_0 \leq x \leq x_1, y_0 \leq y \leq y_1$ | P=0 | -- | LID,x,y,P | PEN-UP |
| $t_2$ PEN TIP COMES INTO CONTACT WITH PANEL SURFACE | $x_0 \leq x \leq x_1, y_0 \leq y \leq y_1$ | P=0 | -- | LID,x,y,P | PEN-UP |
| $t_3$ | $x_0 \leq x \leq x_1, y_0 \leq y \leq y_1$ | P>0 | PEN-DOWN | LID,x,y,P | PEN-DOWN |
| $t_4$ | $x_0 \leq x \leq x_1, y_0 \leq y \leq y_1$ | P>0 | -- | LID,x,y,P | PEN MOVEMENT |
| $t_5$ PEN TIP MOVES TO REGION R2 | $x_0 \leq x \leq x_1, y_0 \leq y \leq y_1$ | P>0 | -- | LID,x,y,P | PEN MOVEMENT |
| $t_6$ | $x_1 < x \leq x_2, y_0 \leq y \leq y_1$ | P>0 | -- | LID,$x_1$,y,P | PEN MOVEMENT |
| $t_7$ | $x_1 < x \leq x_2, y_0 \leq y \leq y_1$ | P>0 | -- | LID,$x_1$,y,P | PEN MOVEMENT |
| $t_8$ | $x_1 < x \leq x_2, y_0 \leq y \leq y_1$ | P>0 | -- | LID,$x_1$,y,P | PEN MOVEMENT |
| $t_9$ | $x_1 < x \leq x_2, y_0 \leq y \leq y_1$ | P>0 | -- | LID,$x_1$,y,P | PEN MOVEMENT |
| $t_{10}$ PEN TIP MOVES TO REGION R1 | $x_0 \leq x \leq x_1, y_0 \leq y \leq y_1$ | P>0 | -- | LID,x,y,P | PEN MOVEMENT |
| $t_{11}$ | $x_0 \leq x \leq x_1, y_0 \leq y \leq y_1$ | P>0 | -- | LID,x,y,P | PEN MOVEMENT |
| $t_{12}$ PEN TIP IS SEPARATED FROM PANEL SURFACE | $x_0 \leq x \leq x_1, y_0 \leq y \leq y_1$ | P=0 | PEN-UP | LID,x,y,P | PEN-UP |
| $t_{13}$ DISTANCE BETWEEN STYLUS AND PANEL SURFACE INCREASES | $x_0 \leq x \leq x_1, y_0 \leq y \leq y_1$ | P=0 | -- | LID,x,y,P | PEN-UP |
| $t_{14}$ | UNDETECTED | UNDETECTED | -- | -- | -- |

COMPARATIVE EXAMPLE 2-1

FIG. 18

| | COORDINATES (x, y) | PEN PRESSURE VALUE P | REPORT CONTENTS | | HOST PROCESSOR |
|---|---|---|---|---|---|
| $t_0$ — STYLUS APPROACHES PANEL SURFACE | UNDETECTED | UNDETECTED | -- | -- | -- |
| $t_1$ | $x_0 \leq x \leq x_1, y_0 \leq y \leq y_1$ | $P=0$ | -- | $LID, x_1, y, P$ | PEN-UP |
| $t_2$ — PEN TIP COMES INTO CONTACT WITH PANEL SURFACE | $x_0 \leq x \leq x_1, y_0 \leq y \leq y_1$ | $P=0$ | -- | $LID, x_1, y, P$ | PEN-UP |
| $t_3$ | $x_0 \leq x \leq x_1, y_0 \leq y \leq y_1$ | $P>0$ | PEN-DOWN | $LID, x_1, y, P$ | PEN-DOWN |
| $t_4$ | $x_0 \leq x \leq x_1, y_0 \leq y \leq y_1$ | $P>0$ | -- | $LID, x_1, y, P$ | PEN MOVEMENT |
| $t_5$ — PEN TIP MOVES TO REGION R2 | $x_0 \leq x \leq x_1, y_0 \leq y \leq y_1$ | $P>0$ | -- | $LID, x_1, y, P$ | PEN MOVEMENT |
| $t_6$ | $x_1 < x \leq x_2, y_0 \leq y \leq y_1$ | $P>0$ | PEN-UP | $LID, x_1, y, P$ | PEN-UP |
| $t_7$ | $x_1 < x \leq x_2, y_0 \leq y \leq y_1$ | $P=0$ | -- | $LID, x_1, y, P$ | PEN-UP |
| $t_8$ — PEN TIP PASSES LEVEL DIFFERENCE 5d | $x_1 < x \leq x_2, y_0 \leq y \leq y_1$ | $P>>0$ | PEN-DOWN | $LID, x_1, y, P$ | PEN-DOWN |
| $t_9$ | $x_1 < x \leq x_2, y_0 \leq y \leq y_1$ | $P>0$ | -- | $LID, x_1, y, P$ | PEN MOVEMENT |
| $t_{10}$ — PEN TIP MOVES TO REGION R1 | $x_0 \leq x \leq x_1, y_0 \leq y \leq y_1$ | $P>0$ | -- | $LID, x_1, y, P$ | PEN MOVEMENT |
| $t_{11}$ | $x_0 \leq x \leq x_1, y_0 \leq y \leq y_1$ | $P>0$ | PEN-UP | $LID, x_1, y, P$ | PEN MOVEMENT |
| $t_{12}$ — PEN TIP IS SEPARATED FROM PANEL SURFACE | $x_0 \leq x \leq x_1, y_0 \leq y \leq y_1$ | $P=0$ | -- | $LID, x_1, y, P$ | PEN-UP |
| $t_{13}$ — DISTANCE BETWEEN STYLUS AND PANEL SURFACE INCREASES | UNDETECTED | UNDETECTED | -- | -- | -- |

COMPARATIVE EXAMPLE 2-2

FIG. 20

| t | COORDINATES (x, y) | PEN PRESSURE VALUE P | REPORT CONTENTS | HOST PROCESSOR |
|---|---|---|---|---|
| $t_0$ | UNDETECTED | UNDETECTED | --- | --- |
| $t_1$ | $x_0 \leq x \leq x_1, y_0 \leq y \leq y_1$ | $P=0$ | --- | PEN-UP |
| $t_2$ | $x_0 \leq x \leq x_1, y_0 \leq y \leq y_1$ | $P=0$ | --- | PEN-UP |
| $t_3$ | $x_0 \leq x \leq x_1, y_0 \leq y \leq y_1$ | $P>0$ | PEN-DOWN | PEN-DOWN |
| $t_4$ | $x_0 \leq x \leq x_1, y_0 \leq y \leq y_1$ | $P>0$ | --- | PEN MOVEMENT |
| $t_5$ | $x_0 \leq x \leq x_1, y_0 \leq y \leq y_1$ | $P>0$ | --- | PEN MOVEMENT |
| $t_6$ | $x_1 < x \leq x_2, y_0 \leq y \leq y_1$ | $P>0$ | --- | PEN MOVEMENT |
| $t_7$ | $x_1 < x \leq x_2, y_0 \leq y \leq y_1$ | $P=0$ | --- | PEN MOVEMENT |
| $t_8$ | $x_1 < x \leq x_2, y_0 \leq y \leq y_1$ | $P>>0$ | --- | PEN MOVEMENT |
| $t_9$ | $x_1 < x \leq x_2, y_0 \leq y \leq y_1$ | $P>0$ | --- | PEN MOVEMENT |
| $t_{10}$ | $x_0 \leq x \leq x_1, y_0 \leq y \leq y_1$ | $P>0$ | --- | PEN MOVEMENT |
| $t_{11}$ | $x_0 \leq x \leq x_1, y_0 \leq y \leq y_1$ | $P>0$ | --- | PEN MOVEMENT |
| $t_{12}$ | $x_0 \leq x \leq x_1, y_0 \leq y \leq y_1$ | $P=0$ | PEN-UP | PEN-UP |
| $t_{13}$ | UNDETECTED | UNDETECTED | --- | --- |

Left-side event annotations:
- $t_0$: STYLUS APPROACHES PANEL SURFACE
- $t_2$: PEN TIP COMES INTO CONTACT WITH PANEL SURFACE
- $t_5$: PEN TIP MOVES TO REGION R2
- $t_7$: PEN TIP PASSES LEVEL DIFFERENCE 5d
- $t_{10}$: PEN TIP MOVES TO REGION R1
- $t_{12}$: PEN TIP IS SEPARATED FROM PANEL SURFACE
- $t_{13}$: DISTANCE BETWEEN STYLUS AND PANEL SURFACE INCREASES Report contents column shows LID,x,y,P for $t_1$ through $t_{12}$.

EXAMPLE 2

FIG. 24

| t | COORDINATES (x, y) | PEN PRESSURE VALUE P | REPORT CONTENTS | | HOST PROCESSOR |
|---|---|---|---|---|---|
| $t_0$ | UNDETECTED | UNDETECTED | -- | -- | -- |
| $t_1$ | $x_0 \leq x \leq x_1, y_0 \leq y \leq y_1$ | $P=0$ | -- | $LID1, x, y, P$ | PEN-UP |
| $t_2$ | $x_0 \leq x \leq x_1, y_0 \leq y \leq y_1$ | $P=0$ | -- | $LID1, x, y, P$ | PEN-UP |
| $t_3$ | $x_0 \leq x \leq x_1, y_0 \leq y \leq y_1$ | $P>0$ | PEN-DOWN | $LID1, x, y, P$ | PEN-DOWN |
| $t_4$ | $x_0 \leq x \leq x_1, y_0 \leq y \leq y_1$ | $P>0$ | -- | $LID1, x, y, P$ | PEN MOVEMENT |
| $t_5$ | $x_0 \leq x \leq x_1, y_0 \leq y \leq y_1$ | $P>0$ | -- | $LID1, x, y, P$ | PEN MOVEMENT |
| $t_6$ | $x_0 \leq x \leq x_1, y_1 < y \leq y_2$ | $P>0$ | -- | $LID1, x, y_1, P$ | PEN MOVEMENT |
| $t_7$ | $x_0 \leq x \leq x_1, y_1 < y \leq y_2$ | $P=0$ | -- | $LID1, x, y_1, P$ | PEN-UP |
| $t_8$ | UNDETECTED | $P>>0$ | PEN-DOWN | -- | (END) |
| $t_9$ | UNDETECTED | UNDETECTED | PEN-UP | -- | -- |
| $t_{10}$ | UNDETECTED | UNDETECTED | -- | -- | -- |
| $t_{11}$ | $x_0 \leq x \leq x_1, y_3 \leq y \leq y_4$ | $P>0$ | PEN-DOWN | $LID2, x, y_4, P$ | PEN-DOWN |
| $t_{12}$ | $x_0 \leq x \leq x_1, y_3 \leq y \leq y_4$ | $P>0$ | -- | $LID2, x, y_4, P$ | PEN MOVEMENT |
| $t_{13}$ | $x_0 \leq x \leq x_1, y_3 \leq y \leq y_4$ | $P>0$ | -- | $LID2, x, y_4, P$ | PEN MOVEMENT |
| $t_{14}$ | $x_0 \leq x \leq x_1, y_4 \leq y \leq y_5$ | $P>0$ | -- | $LID2, x, y, P$ | PEN MOVEMENT |
| $t_{15}$ | $x_0 \leq x \leq x_1, y_4 \leq y \leq y_5$ | $P>0$ | -- | $LID2, x, y, P$ | PEN MOVEMENT |
| $t_{16}$ | $x_0 \leq x \leq x_1, y_4 \leq y \leq y_5$ | $P=0$ | -- | $LID2, x, y, P$ | PEN-UP |
| $t_{17}$ | UNDETECTED | UNDETECTED | PEN-UP | -- | (END) |

STYLUS APPROACHES DISPLAY 3a — $t_0$
PEN TIP COMES INTO CONTACT WITH PANEL SURFACE OF DISPLAY 3a — $t_2$
PEN TIP MOVES TO REGION R2aa — $t_5$
PEN TIP MOVES TO REGION R3 — $t_7$
PEN TIP MOVES TO REGION R2ba — $t_{10}$
PEN TIP MOVES TO REGION R1b — $t_{13}$
PEN TIP IS SEPARATED FROM PANEL SURFACE OF DISPLAY 3b — $t_{15}$
DISTANCE BETWEEN STYLUS AND DISPLAY 3b INCREASES — $t_{16}$

COMPARATIVE EXAMPLE 3

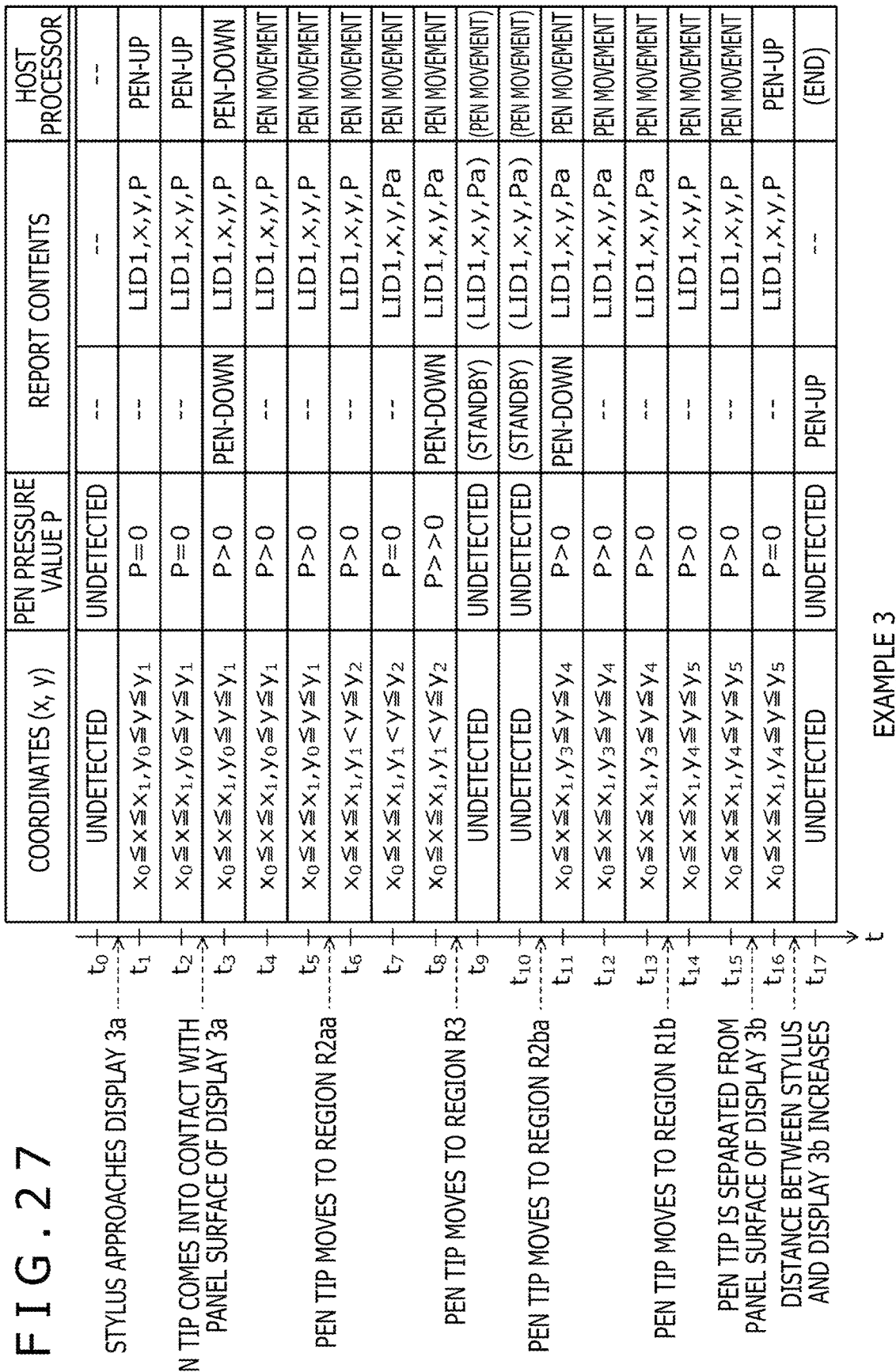
FIG. 27    EXAMPLE 3

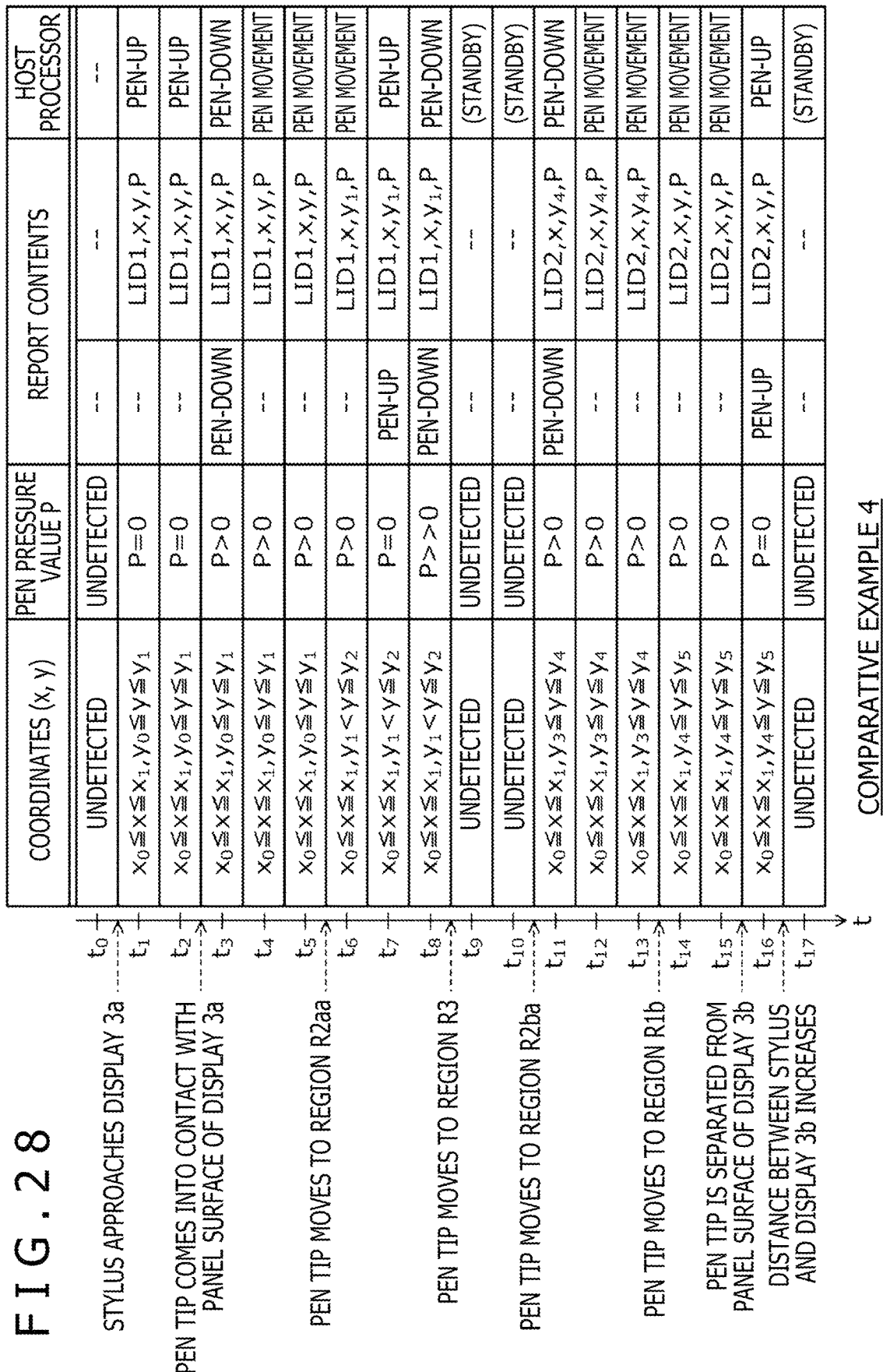

FIG. 28

COMPARATIVE EXAMPLE 4

| | COORDINATES (x, y) | PEN PRESSURE VALUE P | REPORT CONTENTS | | HOST PROCESSOR |
|---|---|---|---|---|---|
| $t_0$ | UNDETECTED | UNDETECTED | -- | -- | -- |
| $t_1$ | $x_0 \leq x \leq x_1, y_0 \leq y \leq y_1$ | $P=0$ | -- | $LID1, x, y, P$ | PEN-UP |
| $t_2$ | $x_0 \leq x \leq x_1, y_0 \leq y \leq y_1$ | $P=0$ | -- | $LID1, x, y, P$ | PEN-UP |
| $t_3$ | $x_0 \leq x \leq x_1, y_0 \leq y \leq y_1$ | $P>0$ | PEN-DOWN | $LID1, x, y, P$ | PEN-DOWN |
| $t_4$ | $x_0 \leq x \leq x_1, y_0 \leq y \leq y_1$ | $P>0$ | -- | $LID1, x, y, P$ | PEN MOVEMENT |
| $t_5$ | $x_0 \leq x \leq x_1, y_0 \leq y \leq y_1$ | $P>0$ | -- | $LID1, x, y, P$ | PEN MOVEMENT |
| $t_6$ | $x_0 \leq x \leq x_1, y_1 < y \leq y_2$ | $P>0$ | -- | $LID1, x, y, P$ | PEN MOVEMENT |
| $t_7$ | $x_0 \leq x \leq x_1, y_1 < y \leq y_2$ | $P=0$ | PEN-UP | $LID1, x, y_1, P$ | PEN-UP |
| $t_8$ | $x_0 \leq x \leq x_1, y_1 < y \leq y_2$ | $P>>0$ | PEN-DOWN | $LID1, x, y_1, P$ | PEN-DOWN |
| $t_9$ | UNDETECTED | UNDETECTED | -- | -- | (STANDBY) |
| $t_{10}$ | UNDETECTED | UNDETECTED | -- | -- | (STANDBY) |
| $t_{11}$ | $x_0 \leq x \leq x_1, y_3 \leq y \leq y_4$ | $P>0$ | PEN-DOWN | $LID2, x, y_4, P$ | PEN-DOWN |
| $t_{12}$ | $x_0 \leq x \leq x_1, y_3 \leq y \leq y_4$ | $P>0$ | -- | $LID2, x, y_4, P$ | PEN MOVEMENT |
| $t_{13}$ | $x_0 \leq x \leq x_1, y_3 \leq y \leq y_4$ | $P>0$ | -- | $LID2, x, y_4, P$ | PEN MOVEMENT |
| $t_{14}$ | $x_0 \leq x \leq x_1, y_4 \leq y \leq y_5$ | $P>0$ | -- | $LID2, x, y, P$ | PEN MOVEMENT |
| $t_{15}$ | $x_0 \leq x \leq x_1, y_4 \leq y \leq y_5$ | $P>0$ | -- | $LID2, x, y, P$ | PEN MOVEMENT |
| $t_{16}$ | $x_0 \leq x \leq x_1, y_4 \leq y \leq y_5$ | $P=0$ | PEN-UP | $LID2, x, y, P$ | PEN-UP |
| $t_{17}$ | UNDETECTED | UNDETECTED | -- | -- | (STANDBY) |

- $t_0$: STYLUS APPROACHES DISPLAY 3a
- $t_1$: PEN TIP COMES INTO CONTACT WITH PANEL SURFACE OF DISPLAY 3a
- $t_5$: PEN TIP MOVES TO REGION R2aa
- $t_8$: PEN TIP MOVES TO REGION R3
- $t_{10}$: PEN TIP MOVES TO REGION R2ba
- $t_{13}$: PEN TIP MOVES TO REGION R1b
- $t_{15}$: PEN TIP IS SEPARATED FROM PANEL SURFACE OF DISPLAY 3b
- $t_{16}$: DISTANCE BETWEEN STYLUS AND DISPLAY 3b INCREASES

SENSOR SYSTEM

BACKGROUND

Technical Field

The present invention relates to a sensor system, and particularly to a sensor system for performing pen input by a stylus.

Description of the Related Art

Many recent notebook personal computers have a touch pad or a track pad (hereinafter referred to collectively as a "touch pad"). A touch pad generally has a touch panel for receiving input by a finger (hereinafter referred to as "touch input") and a button function for realizing a function equivalent to a right click function or a left click function of a mouse device. A touch pad is classified into either a discrete type or a non-discrete type depending on whether or not the touch panel and the button function are provided by separate mechanisms.

The discrete type touch pad has a dedicated button for click operation separately from the touch panel. On the other hand, the non-discrete type touch pad does not have such a dedicated button, but allows click operation to be realized by pressing the touch panel. The non-discrete type touch pad can be further divided into two types, that is, a "click pad" and a "pressure pad" according to specific structures for realizing a click by depressing the touch panel. The click pad is a type of touch pad in which the touch panel is displaced downward when depressed by a user. The click pad includes a click button directly under the touch panel. On the other hand, the pressure pad is a type of touch pad that detects a pressing force applied to the touch panel by a force sensor, and realizes a click by threshold value determination of output of the force sensor. See, Eliot Graff et al., "Windows Precision Touchpad Collection," [online], May 2, 2017, Microsoft Corporation [retrieved on Jan. 15, 2020], the Internet <URL: https://docs.microsoft.com/en-us/windows-hardware/design/component-guidelines/touchpad-windows-precision-touchpad-collection>, which discloses the above three types of touch pads (the discrete type, the click pad, and the pressure pad).

In addition, attention has recently been directed to a folding type tablet terminal having two screens. In the following, this kind of tablet terminal will be referred to as a "dual screen model." With the advent of the dual screen model, development of a technology for enabling the use of both touch input and input by a stylus (hereinafter referred to as "pen input") on each of the two screens has been underway.

Japanese Patent Laid-Open No. 2019-133487 discloses an example of such technology. As described in Japanese Patent Laid-Open No. 2019-133487, a sensor system is provided within the dual screen model, wherein the sensor system includes a first integrated circuit connected to a sensor electrode group for a first screen, a second integrated circuit connected to a sensor electrode group for a second screen, and a host processor connected to the first and second integrated circuits. Touch input and pen input are realized by the sensor system.

When a sensor electrode group is provided on the inside of the panel surface of a touch panel or the display surface of a display (hereinafter referred to collectively as a "panel surface") in order to realize pen input and touch input, the sensor electrode group may be disposed over a region slightly greater than a region corresponding to the corresponding panel surface (hereinafter referred to as an "effective region"). In that case, a region in which the stylus can be detected is slightly larger than the effective region. In the following, a region outside the effective region in the region in which the stylus can be detected will be referred to as a "detectable region." Japanese Patent Laid-Open No. 2000-099260 describes conversion of the position of a detected stylus to a position within the effective region in a case where the position of the detected stylus is within the detectable region.

BRIEF SUMMARY

Unlike the effective region, the detectable region is a region in which sliding of a finger or the stylus is not expected. As such, an obstacle such as a level difference or a groove may be present in the detectable region. Because the obstacle is very small, no problem occurs at all when touch input is performed by using a relatively thick fingertip, but the obstacle causes an erroneous operation when pen input is performed by using the pen tip of a relatively thin stylus. That is, when the pen tip of the stylus passes the obstacle, a sharp change may occur in a pen pressure value detected by the stylus, and an erroneous operation such as erroneous tapping occurs because this change causes a pen-down not intended by the user.

It is accordingly one aspect of the present invention to provide a sensor system that can prevent occurrence of an erroneous operation in pen input.

In addition, as for the dual screen model, there is a desire from users to draw one line that straddles screens. However, when an obstacle such as a level difference or a groove or a non-sensitive region in which the stylus cannot be detected is present between the screens, a pen-up not intended by the user occurs at the obstacle or the non-sensitive region. Thus, the line drawing is broken.

It is accordingly another aspect of the present invention to provide a sensor system that enables one line to be drawn so as to straddle the screens of the dual screen model.

According to an aspect of the present invention, there is provided a sensor system that detects a stylus on at least one panel surface having an effective region, the sensor system including an obtaining step of obtaining a position of the stylus and a pen pressure value indicating a pressure applied to a pen tip of the stylus and an output step of outputting the position and the pen pressure value obtained in the obtaining step to a host processor. When the position obtained in the obtaining step is outside the effective region, occurrence of at least one of a pen-down indicating the stylus contacting the panel surface and a pen-up indicating the stylus being detached from the panel surface is concealed from the host processor.

According to an aspect of the present invention, no pen-down occurs when the pen tip is located outside the effective region, and therefore occurrence of an erroneous operation in pen input can be prevented. In addition, no pen-up occurs when the pen tip is located outside the effective region, and therefore one line can be drawn so as to straddle the screens of a dual screen model.

BRIEF DESCRIPTION OF THE DRAWINGS

FIG. 8 is a diagram illustrating a first example (comparative example 1-1) of a result of performing processing according to the background art, wherein such processing is illustrated in FIG. 5 and FIGS. 6A and 6B;

FIG. 9 is a diagram illustrating a second example (comparative example 1-2) of a result of performing the processing according to the background art, wherein such processing is illustrated in FIG. 5 and FIGS. 6A and 6B;

FIG. 11 is a diagram illustrating an example (example 1-1) of a result of performing the position etc. report processing illustrated in FIG. 10;

FIG. 13 is a diagram illustrating an example (example 1-2) of a result of performing the position etc. report processing illustrated in FIG. 12;

FIG. 17 is a diagram illustrating a first example (comparative example 2-1) of a result of performing the processing according to the background art, wherein such processing is illustrated in FIG. 16;

FIG. 18 is a diagram illustrating a second example (comparative example 2-2) of a result of performing the processing according to the background art, wherein such processing is illustrated in FIG. 16;

FIG. 20 is a diagram illustrating an example (example 2) of a result of performing the state report processing according to the present embodiment, wherein such processing is illustrated in FIG. 19;

FIG. 24 is a diagram illustrating an example (comparative example 3) of a result of performing processing according to the background art, in relation to the third embodiment of the present invention;

FIG. 27 is a diagram illustrating an example (example 3) of a result of performing the processing according to the third embodiment of the present invention, wherein such processing is illustrated in FIG. 25 and FIG. 26;

FIG. 28 is a diagram illustrating an example (comparative example 4) of a result of performing processing according to the background art, in relation to a fourth embodiment of the present invention;

DETAILED DESCRIPTION

Embodiments of the present invention will hereinafter be described in detail with reference to the drawings.

First Embodiment

Figure 1:
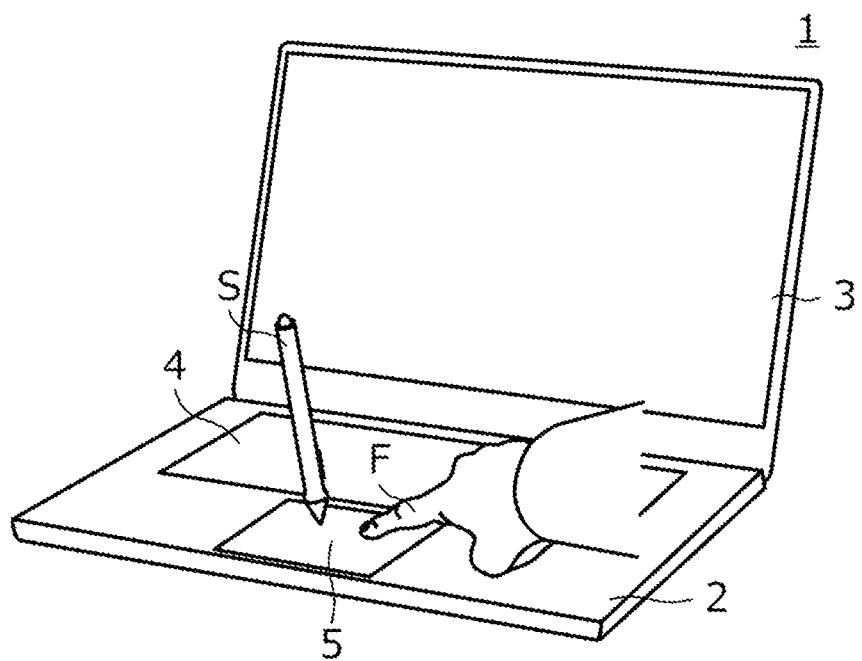
FIG. 1 is a diagram illustrating a notebook personal computer according to a first embodiment of the present invention.
Figure 2:
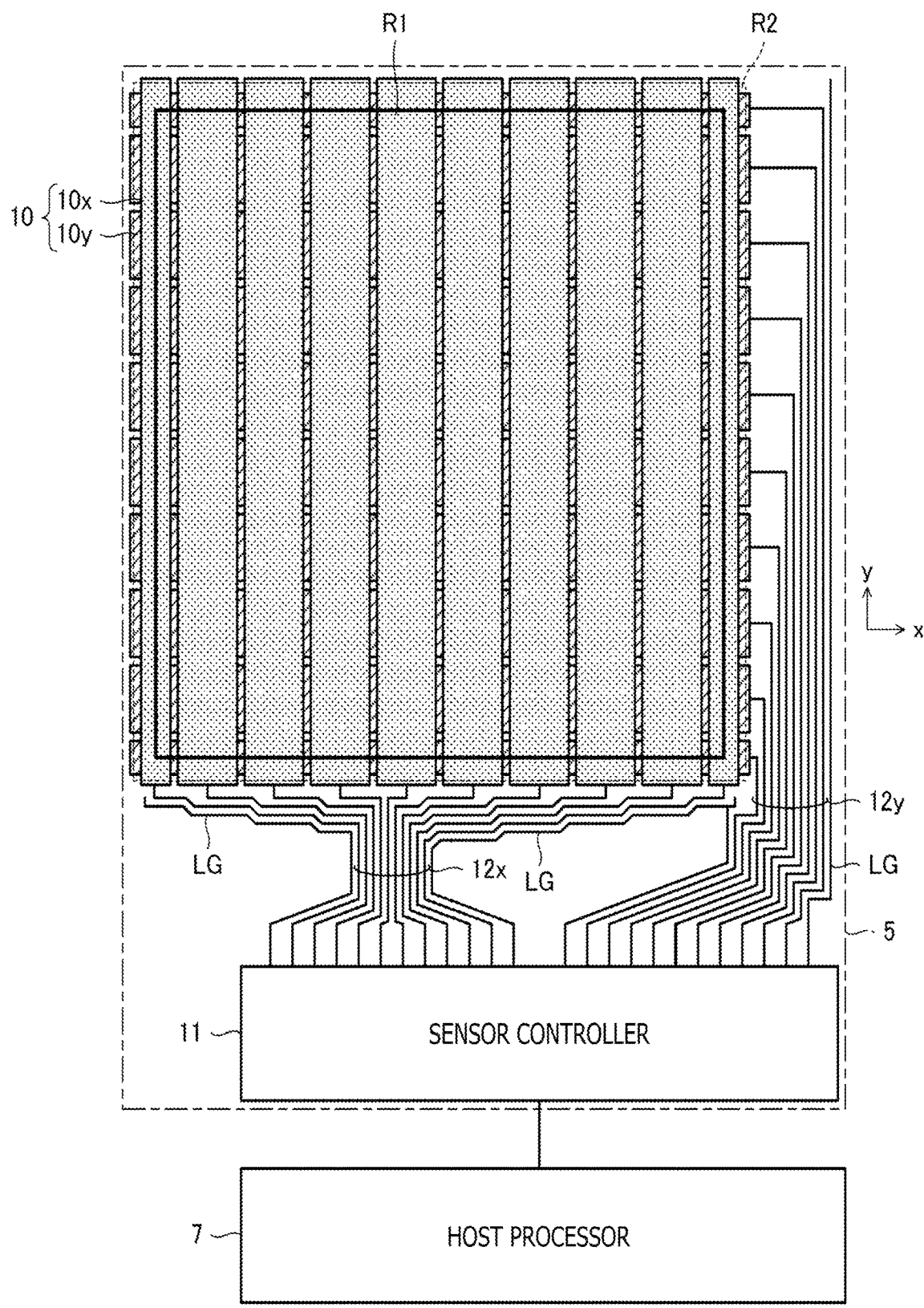
FIG. 2 is a diagram illustrating an internal configuration of the notebook personal computer illustrated in FIG. 1.

FIG. 1 is a diagram illustrating a notebook personal computer 1 according to a first embodiment of the present invention. As illustrated in FIG. 1, the notebook personal computer 1 includes a casing 2, a display 3, a keyboard 4, and a touch pad 5. FIG. 2 is a diagram illustrating an internal configuration of the notebook personal computer 1. FIG. 1 illustrates only parts related to the touch pad 5. As illustrated in FIG. 2, a host processor 7 is provided within the notebook personal computer 1.

The host processor 7 is a central processing unit that controls various parts of the notebook personal computer 1. The host processor 7 plays a role of reading and executing programs stored in a memory, which is not illustrated. The programs executed by the host processor 7 include an operating system of the notebook personal computer 1, various kinds of drawing applications, various kinds of communication programs, and the like.

The display 3 is an output section for outputting visual information under control of the host processor 7. The keyboard 4 and the touch pad 5 are input sections that play a role of receiving user input and supplying the user input to the host processor 7. The notebook personal computer 1 is further provided with various kinds of input-output sections and communicating sections that are possessed by an ordinary computer.

Figure 3A:
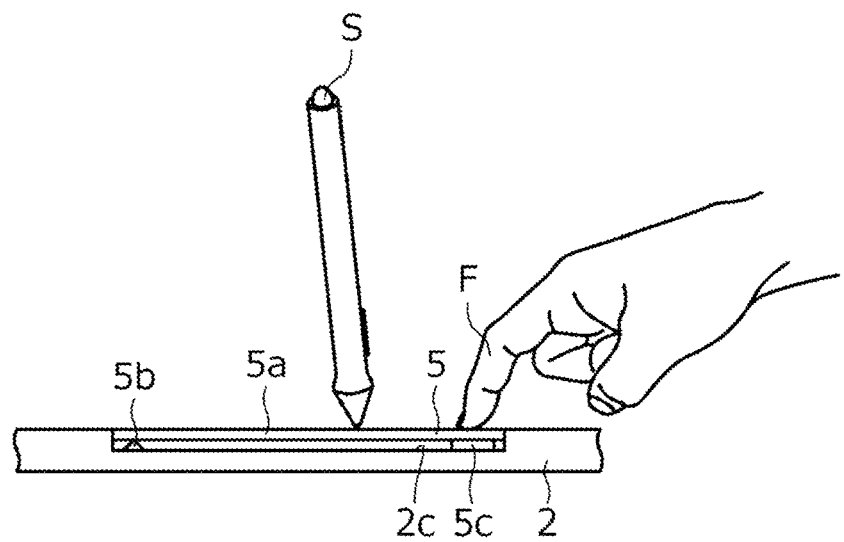
FIGS. 3A and 3B are sectional views of a casing in the vicinity of a touch pad illustrated in FIG. 1.
Figure 3B:
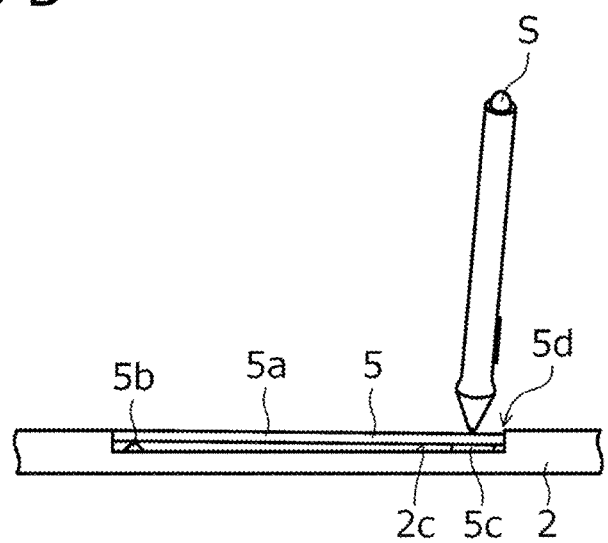

FIGS. 3A and 3B are sectional views of the casing 2 in the vicinity of the touch pad 5. The touch pad 5 is a click pad described above. The touch pad 5 includes a touch panel 5a, a fulcrum 5b, and a click button 5c. The touch pad 5 is embedded as a whole in a rectangular recessed portion 2c provided in the casing 2. In an initial state, a surface of the touch panel 5a is maintained in a state of being parallel with a surface of the casing 2.

As is understood from FIG. 3A, the touch pad 5 supports both pen input and touch input described above. Pen input is realized when a user slides a pen tip of a stylus S on the touch panel 5a, and a sensor controller 11 (see FIG. 2) to be described later detects a trajectory of the pen tip of the stylus S. In addition, touch input is realized when the user slides a finger F of the user on the touch panel 5a, and the sensor controller 11 (see FIG. 2) detects a trajectory of the finger F.

The fulcrum 5b and the click button 5c are each disposed between an undersurface of the touch panel 5a and a bottom surface of the recessed portion 2c in a vertical direction. The fulcrum 5b and the click button 5c are respectively arranged on a far side and a near side of the recessed portion 2c, in a horizontal direction, as viewed from the user of the notebook personal computer 1. When the stylus S or the finger F applies a pressure to a vicinity region of an upper surface of the touch panel 5a, the vicinity region being above the click button 5c, a part of the touch panel 5a sinks as illustrated in FIG. 3B. When an amount of sinking becomes a certain amount or more, the click button 5c is depressed. A click is thus realized. When a part of the touch panel 5a sinks, a level difference 5d occurs between the touch panel 5a and the casing 2, as illustrated in FIG. 3B. Because the level difference 5d is very small, no problem occurs at all when touch input is performed by a relatively thick finger F, but the level difference 5d causes an erroneous operation described above when pen input is performed by using the pen tip of a relatively thin stylus S.

Figure 4:
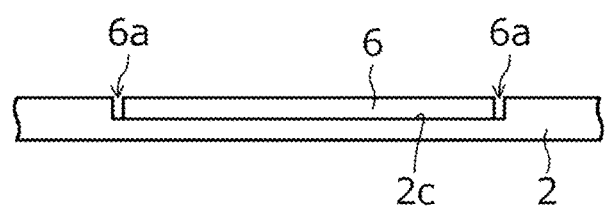
FIG. 4 is a sectional view of a casing constituting a notebook personal computer according to a modification of the first embodiment of the present invention.

FIG. 4 is a sectional view of the casing 2 constituting a notebook personal computer 1a according to a modification of the present embodiment. The notebook personal computer 1a according to the present modification is different from the notebook personal computer 1 according to the present embodiment in that the notebook personal computer 1a has a touch pad 6 as a discrete type or a pressure pad in place of the touch pad 5 as a click pad. Unlike the touch pad 5, the touch pad 6 does not sink. However, there may be a slight groove 6a as illustrated in FIG. 4 or a level difference not illustrated in FIG. 4 between the touch pad 6 and a side surface of the recessed portion 2c. Because these obstacles (gaps) are also very small, no problem occurs at all when touch input is performed by a relatively thick finger F, but the obstacles cause an erroneous operation described above when pen input is performed by using the pen tip of a relatively thin stylus S. In the following, description will be made with attention directed to the touch pad 5. However, the present invention is similarly applicable also to the touch pad 6.

Returning to FIG. 2, the touch pad 5 includes a sensor 10 including a plurality of sensor electrodes 10x and a plurality of sensor electrodes 10y, a sensor controller 11, a plurality of routing lines 12x for connecting each sensor electrode 10x to the sensor controller 11, a plurality of routing lines 12y for connecting each sensor electrode 10y to the sensor controller 11, and guard wiring LG for isolating each of the routing lines 12x and 12y from an external environment.

The sensor controller 11 is an integrated circuit configured to be able to perform various processing operations. The processing operations performed by the sensor controller 11 includes processing of detecting positions of the stylus S and the finger F within a panel surface of the touch panel 5a and receiving data transmitted by the stylus S, and outputting the detected positions and the received data to the host processor 7. In the present specification, this output may be referred to as a "report." The sensor controller 11 and the host processor 7 constitute a sensor system according to the present invention. Each processing operation to be described later is performed by one of or both the sensor controller 11 and the host processor 7.

The sensor controller 11 and the stylus S are configured to be able to communicate bidirectionally via the sensor 10. In the following, a signal transmitted by the sensor controller 11 to the stylus S will be referred to as an "uplink signal," and a signal transmitted by the stylus S to the sensor controller 11 will be referred to as a "downlink signal." Details of communication between the sensor controller 11 and the stylus S will be described later in detail with reference to FIG. 5 and FIGS. 6A and 6B.

As illustrated in FIG. 2, the touch pad 5 includes an effective region R1 and a detectable region R2. The effective region R1 is a region corresponding to the panel surface of the touch panel 5a. On the other hand, the detectable region R2 is a region outside the effective region R1 in a region in which the sensor controller 11 can detect the stylus S. The detectable region R2 is disposed so as to enclose the effective region R1.

In the following, processing performed by the sensor system according to the present embodiment will be described in detail after description of processing according to the background art.

Figure 5:
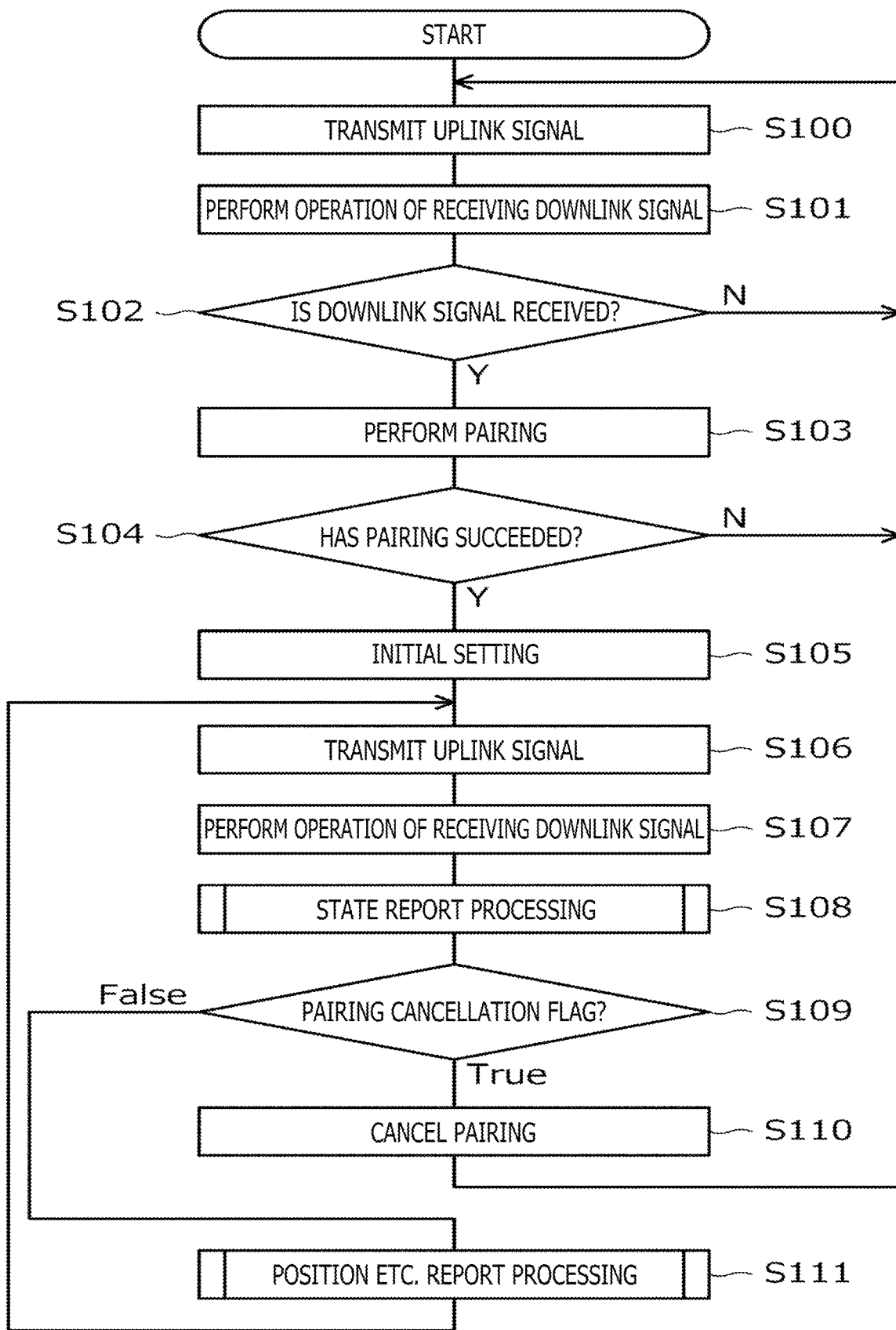
FIG. 5 is a diagram illustrating processing performed by a sensor system according to the background art in relation to the first embodiment of the present invention.
Figure 6A:
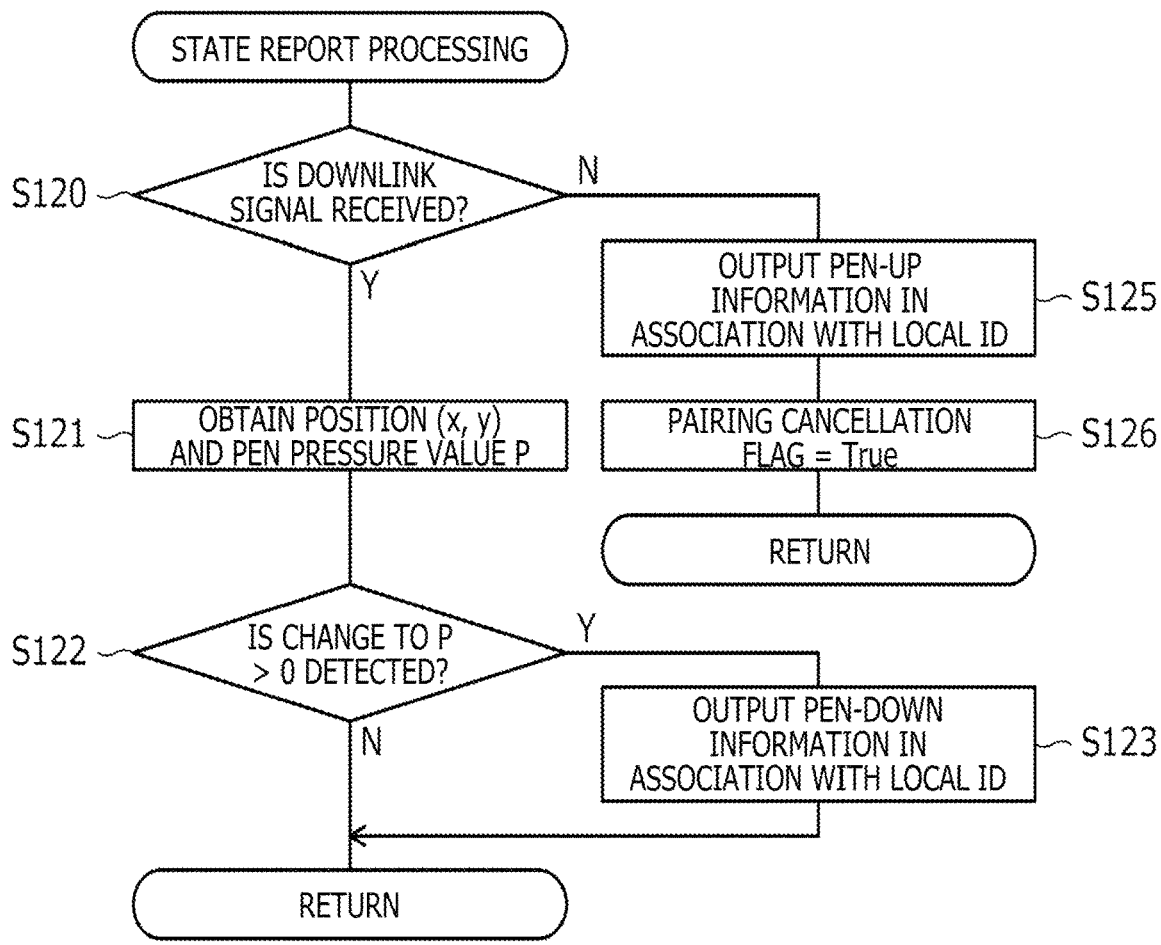
FIG. 6A is a diagram illustrating details of "state report processing" performed in step S108 in FIG. 5.
Figure 6B:
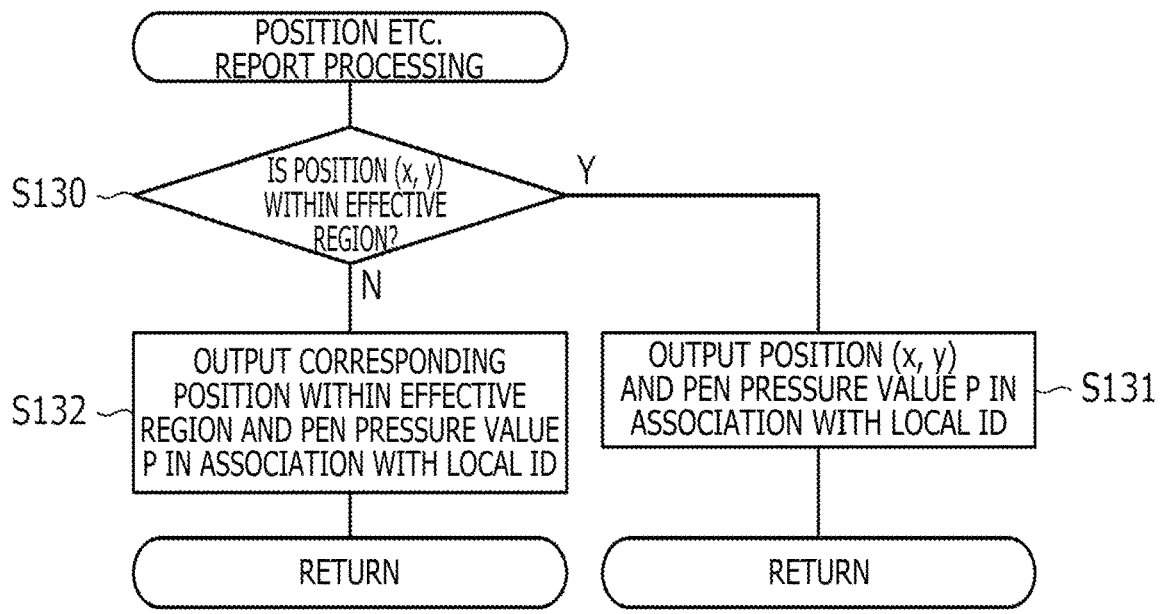
FIG. 6B is a diagram illustrating details of "position etc. report processing" performed in step S111 in FIG. 5.

FIG. 5 is a diagram illustrating processing performed by the sensor system according to the background art. The figure illustrates processing in which the sensor controller 11 pairs with a new stylus S, obtains the state, position, and the like of the stylus S, and reports the state, position, and the like of the stylus S to the host processor 7. FIG. 6A is a diagram illustrating details of "state report processing" performed in step S108 in FIG. 5. FIG. 6B is a diagram illustrating details of "position etc. report processing" performed in step S111 in FIG. 5.

First, the sensor controller 11 transmits an uplink signal via the sensor 10 (step S100). The sensor controller 11 periodically transmits the uplink signal, and performs a downlink signal receiving operation each time the sensor controller 11 transmits the uplink signal (step S101).

The sensor controller 11 determines whether or not a downlink signal is received as a result of the receiving operation performed in step S101 (step S102). When the sensor controller 11 determines that no downlink signal is received, the sensor controller 11 returns to step S100 to repeat the processing. When the sensor controller 11 determines that a downlink signal is received, on the other hand, the sensor controller 11 performs pairing with the stylus S as a transmission source of the downlink signal (step S103). Specifically, the sensor controller 11 determines communication resources (a time slot, a frequency, a spread code, and the like) to be assigned to the stylus S and a local identification (ID) to be assigned to the stylus S, and transmits an uplink signal indicating the communication resources and the local ID. The sensor controller 11 receives a pen ID from the stylus S by a downlink signal transmitted as a response to the uplink signal. When the pen ID can be thus received, the sensor controller 11 stores the received pen ID and information indicating the assigned communication resources in association with the assigned local ID. Pairing is successful when the processing thus far is completed. The stylus S pairing with the sensor controller 11 stores the assigned communication resources and the assigned local ID.

The sensor controller 11 determines whether or not the pairing with the stylus S has succeeded after step S103 is ended (step S104). When the sensor controller 11 determines that the pairing with the stylus S has failed, the sensor controller 11 returns to step S100 to repeat the processing. When the sensor controller 11 determines that the pairing with the stylus S has succeeded, on the other hand, the sensor controller 11 makes an initial setting for processing to be described in the following (step S105). Specifically, the sensor controller 11 performs processing of setting a value of a pairing cancellation flag, to be described later, to an initial value False and the like.

The sensor controller 11 next transmits an uplink signal (step S106). The uplink signal can include the local ID assigned to the stylus S being paired and a command signal indicating an instruction to the stylus S. Receiving the uplink signal, the stylus S transmits a downlink signal at a timing determined on the basis of a reception timing of the uplink signal and the communication resources stored in advance. In addition, when the uplink signal includes the command signal including the local ID assigned to the stylus S itself, the stylus S performs processing indicated by the command signal.

The downlink signal includes a position signal for the sensor controller 11 to detect the position of the stylus S and a pen pressure value indicating a pressure applied to the pen tip of the stylus S. The stylus S includes a pressure sensor for detecting the pen pressure value. The pen pressure value detected by the pressure sensor is zero when the pen tip of the stylus S is not in contact with the panel surface. The pen pressure value is a value larger than zero when the pen tip of the stylus S is in contact with the panel surface. In a case where the command signal requests transmission of specific data, the downlink signal also includes the data.

The sensor controller 11 performs a downlink signal receiving operation at a timing at which the stylus S transmits the downlink signal (step S107, a receiving step). Then, the sensor controller 11 first performs state report processing (step S108).

The state report processing will be described with reference to FIG. 6A. Upon starting the state report processing, the sensor controller 11 determines whether or not a downlink signal is received as a result of performing step S107, as illustrated in FIG. 6A (step S120). When determining that a downlink signal is received, the sensor controller 11 obtains a position (x, y) of the stylus S on the basis of a reception strength of a position signal in each of the plurality of sensor electrodes 10x and the plurality of sensor electrodes 10y, and obtains a pen pressure value P included in the downlink signal (step S121, an obtaining step). Then, the sensor controller 11 determines whether or not a change in the pen pressure value P from zero to a value larger than zero is detected (step S122). When the sensor controller 11 determines that a change in the pen pressure value P from zero to a value larger than zero is detected, the sensor controller 11 outputs pen-down information indicating occurrence of a pen-down (contact of the stylus S with the panel surface of the touch panel 5a) to the host processor 7 in association with the local ID (step S123, a state output step). When the sensor controller 11 determines that a change in the pen pressure value P from zero to a value larger than zero is not detected, the sensor controller 11 ends the state report processing.

The sensor controller 11 when determining in step S120 that no downlink signal is received outputs pen-up information indicating occurrence of a pen-up (detachment of the stylus S from the panel surface of the touch panel 5a) to the host processor 7 in association with the local ID (step S125, a state output step). The sensor controller 11 further sets a value of a pairing cancellation flag to True (step S126). The sensor controller 11 then ends the state report processing.

The description returns to FIG. 5. Upon ending the state report processing, the sensor controller 11 determines the value of the pairing cancellation flag (step S109). When the value of the pairing cancellation flag is True as a result, the sensor controller 11 cancels the pairing with the stylus S (step S110, a pairing canceling step). Specifically, the sensor controller 11 deletes the information indicating the pen ID and the communication resources which information is stored in association with the assigned local ID. The sensor controller 11 thereafter returns to step S100 to repeat the processing. When the sensor controller 11 determines in step S109 that the value of the pairing cancellation flag is False, on the other hand, the sensor controller 11 performs position etc. report processing (step S111), and then returns the processing to step S106.

The position etc. report processing will be described with reference to FIG. 6B. Starting the position etc. report processing, the sensor controller 11 first determines whether or not the position (x, y) obtained in step S102 is a position within the effective region R1, as illustrated in FIG. 6B (step S130). When determining as a result that the position (x, y) is a position within the effective region R1, the sensor controller 11 outputs the position (x, y) and the pen pressure value P to the host processor 7 in association with the local ID (step S131, a "position etc. output step" or an "output step" for short). The sensor controller 11 then ends the processing. When determining that the position (x, y) is not a position within the effective region R1, on the other hand, the sensor controller 11 obtains a position (corresponding position) within the effective region R1 which position corresponds to the position (x, y), and outputs the corresponding position to the host processor 7 together with the local ID and the pen pressure value P (step S132).

Figure 7:
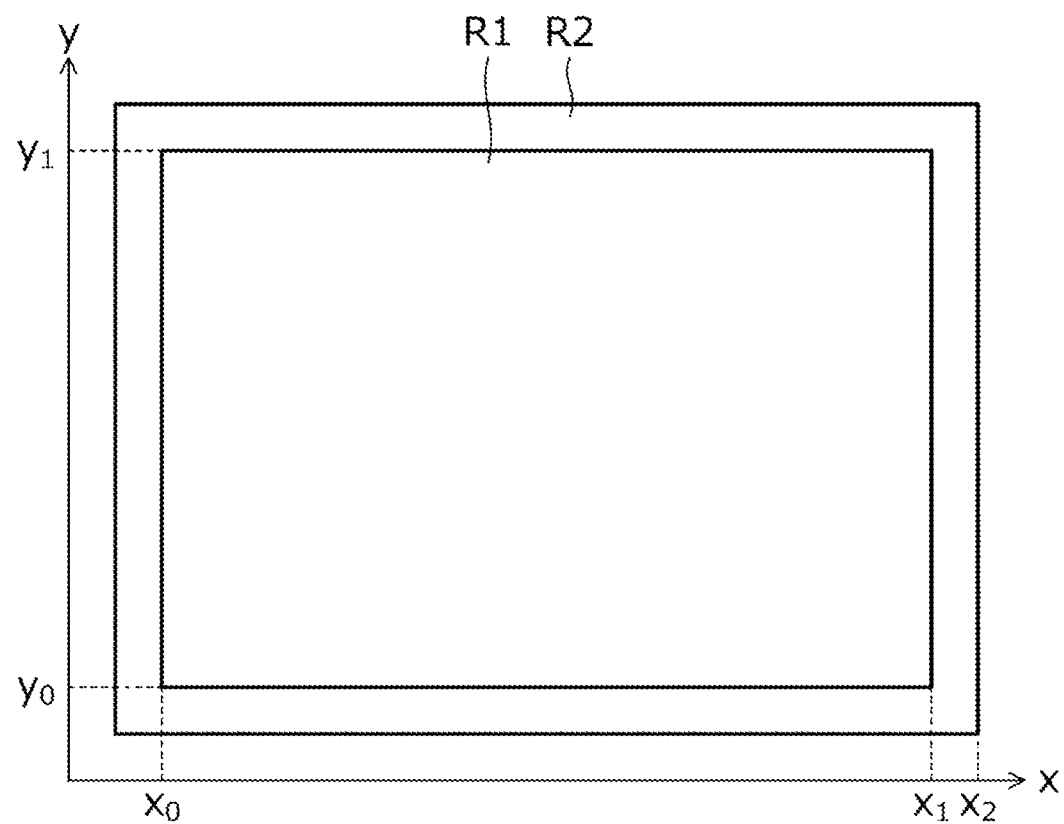
FIG. 7 is a diagram explaining a corresponding position within an effective region.

FIG. 7 is a diagram of assistance in explaining the corresponding position within the effective region R1. In the figure, a longitudinal direction of the effective region R1 is set as an x-direction, and a direction orthogonal to the x-direction is set as a y-direction. An x-coordinate of one end in the x-direction of the effective region R1, an x-coordinate of another end in the x-direction of the effective region R1, a y-coordinate of one end in the y-direction of the effective region R1, and a y-coordinate of another end in the y-direction of the effective region R1 are set as $x_0$, $x_1$, $y_0$, and $y_1$, respectively. Further, an x-coordinate of another end in the x-direction (end portion on an $x_1$ side) of the detectable region R2 is set as $x_2$ ($>x_1$).

The sensor controller 11 compares the position x obtained in step S121 with $x_0$ and $x_1$. When x is smaller than $x_0$ as a result, x is replaced with $x_0$. When x is larger than $x_1$, x is replaced with $x_1$. In addition, the sensor controller 11 compares the position y obtained in step S121 with $y_0$ and $y_1$. When y is smaller than $y_0$, y is replaced with $y_0$. When y is larger than $y_1$, y is replaced with $y_1$. The corresponding position within the effective region R1, which corresponding position corresponds to the position (x, y), is a position obtained as a result of performing the replacement processing.

FIG. 8 is a diagram illustrating a first example (comparative example 1-1) of a result of performing the processing according to the background art as illustrated in FIG. 5 and FIGS. 6A and 6B. Times $t_0$ to $t_{14}$ illustrated in the figure correspond to timings of transmission of a downlink signal by the stylus S. The stylus S according to the present comparative example approaches the panel surface of the touch panel 5a from above the effective region R1 between time $t_0$ and time $t_1$, comes into contact with the panel surface between times $t_2$ and $t_3$, thereafter moves to the detectable region R2 between times $t_5$ and $t_6$ while maintaining the contact state, returns to the effective region R1 between times $t_{10}$ and $t_{11}$, and thereafter separates from the panel surface after the passage of time $t_{12}$. Positions $x_0$, $x_1$, $x_2$, $y_0$, and $y_1$ illustrated in the figure are based on the example illustrated in FIG. 7.

When the stylus S approaches the panel surface, the sensor controller 11 becomes able to obtain the position (x, y) and the pen pressure value P at time $t_1$ after the above-described pairing. At this time point, the pen tip of the stylus S is not in contact with the panel surface yet, and therefore the pen pressure value P is zero. The stylus S is located above the effective region R1, and therefore the detected position (x, y) satisfies $x_0 \leq x \leq x_1$ and $y_0 \leq y \leq y_1$.

When the pen tip of the stylus S thereafter comes into contact with the effective region R1 between times $t_2$ and $t_3$, the pen pressure value P changes to a value larger than zero at time $t_3$. When the pen tip of the stylus S next moves to the detectable region R2 between times $t_5$ and $t_6$, the detected position (x, y) changes to a position within the detectable region R2 at time $t_6$. FIG. 8 illustrates a case where the position x changes to a value satisfying $x_1 \leq x \leq x_2$. When the pen tip of the stylus S thereafter returns to the effective region R1 again between times $t_{10}$ and $t_{11}$, the detected position (x, y) returns to a position within the effective region R1 at time $t_{11}$.

When the pen tip of the stylus S separates from the panel surface between times $t_{12}$ and $t_{13}$, the pen pressure value P changes to zero at time $t_{13}$. When a distance between the stylus S and the panel surface then increases between times $t_{13}$ and $t_{14}$, the downlink signal does not reach the sensor 10 at time $t_{14}$, and the sensor controller 11 becomes unable to obtain the position (x, y) and the pen pressure value P.

During a period from time $t_1$ to time $t_{13}$ during which the position (x, y) and the pen pressure value P can be obtained, the position (x, y) and the pen pressure value P continue to be output from the sensor controller 11 to the host processor 7 in association with the local ID. During a period from time $t_6$ to time $t_{10}$ during which the pen tip of the stylus S is within the detectable region R2, the coordinates of the corresponding position within the effective region R1 are output in place of the obtained position (x, y). In the present example, as illustrated in FIG. 8, a position $x_1$ and y is output.

At time $t_3$ at which the pen pressure value P changes to a value larger than zero, the sensor controller 11 outputs pen-down information to the host processor 7. The sensor controller 11 outputs pen-up information to the host processor 7 at time $t_{14}$ at which the downlink signal cannot be received.

Here, the host processor 7 according to the present embodiment is configured to determine the state of the stylus S on the basis of the pen pressure value P supplied from the sensor controller 11. Specifically, the host processor 7 determines that there is a state of a pen-up when the pen pressure value P is zero, and the host processor 7 determines that a pen-down has occurred when the pen pressure value P has changed from zero to a value larger than zero. While the pen pressure value P continues to be a value larger than zero, the host processor 7 determines that there is a state of pen movement indicating that the stylus S is sliding on the panel surface. The state so determined is used by the host processor 7 for movement of a cursor displayed on a screen, a tap operation, generation and drawing of stroke data, and the like.

The host processor 7 according to the present embodiment is configured to end processing related to the stylus S when pen-up information is supplied from the sensor controller 11. Even when the same stylus S is thereafter used again, the host processor 7 performs processing such as stroke data generation, in a manner different from that of the previous processing.

FIG. 9 is a diagram illustrating a second example (comparative example 1-2) of a result of performing the processing according to the background art as illustrated in FIG. 5 and FIGS. 6A and 6B. The present comparative example is different from the comparative example 1-1 in that the stylus S passes the level difference 5d illustrated in FIG. 3B between times $t_6$ and $t_9$. The present comparative example is otherwise similar to the comparative example 1-1.

While the pen tip traverses over the level difference 5d, the pen pressure value P obtained by the sensor controller 11 is zero, and immediately after the pen tip passes through (and leaves) the level difference 5d, the pen pressure value P temporarily becomes a large value. The thus temporarily large value of the pen pressure value P is written as "P>>0" in FIG. 9 and the following figures.

Because the pen pressure value P changes from zero to a value larger than zero at time $t_9$, the host processor 7 detects a pen-down at time $t_9$. This pen-down occurs due to the stylus S passing through the obstacle presented by the level difference 5d, and is not intended by the user. Also, the position supplied to the host processor 7 at time $t_9$ is not an actual position of the pen tip of the stylus S (position within the detectable region R2), but is substituted as the corresponding position within the effective region R1. Hence, when an operable graphical user interface (GUI). such as the "close" button, is displayed within the display 3 at a position that corresponds to a corresponding position within the effective region R1, an unintended tap operation is triggered, which would then be recognized by the user as an erroneous (unintended) operation.

The sensor system according to the present embodiment prevents occurrence of an erroneous operation as described above by concealing occurrence of a pen-down from the host processor 7 when the obtained position (x, y) is outside the effective region R1. Processing performed by the sensor system according to the present embodiment for that purpose will be described in detail in the following.

Figure 10:
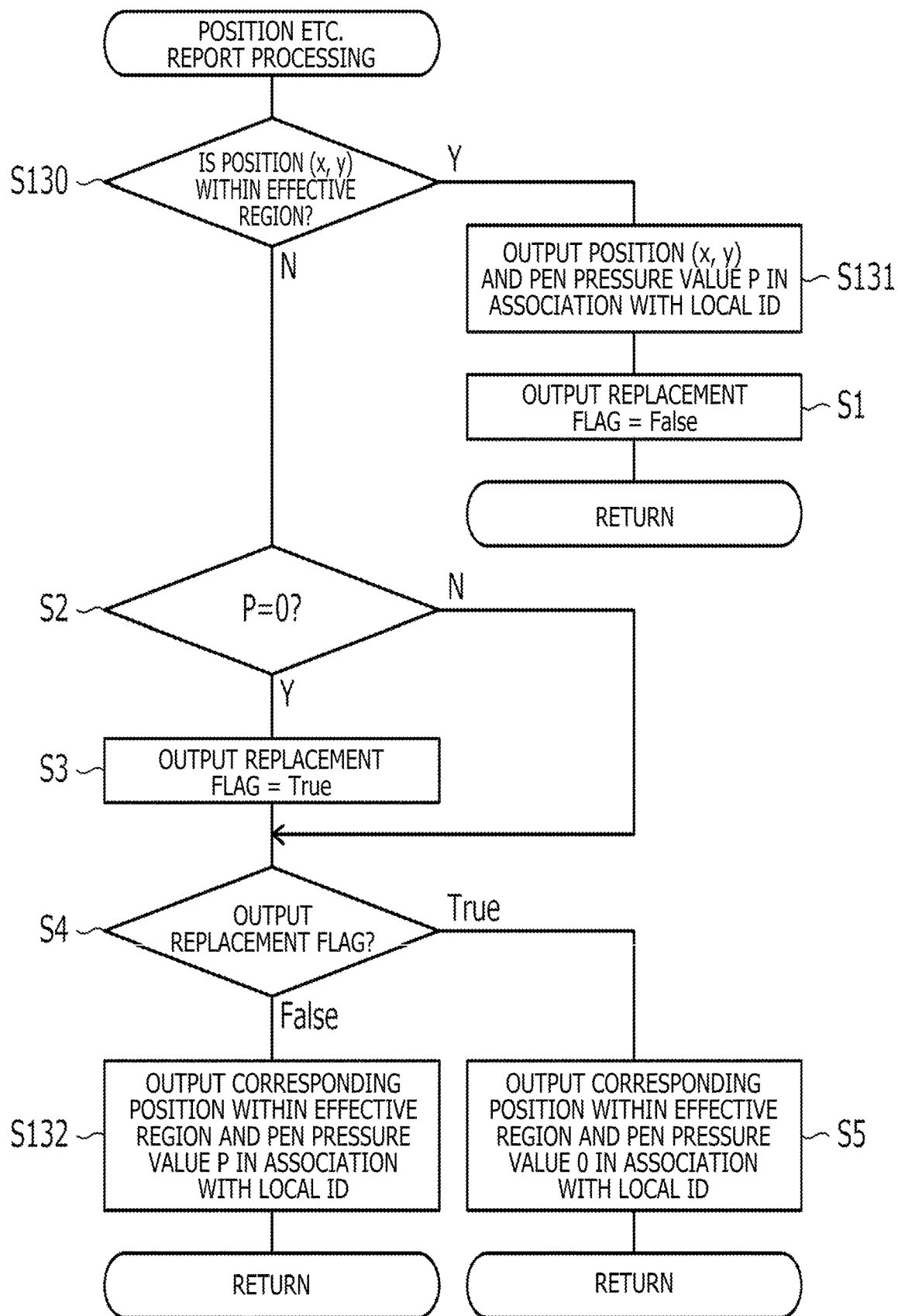
FIG. 10 is a diagram illustrating "position etc. report processing" performed by a sensor system according to the first embodiment of the present invention.

FIG. 10 is a diagram illustrating position etc. report processing performed by the sensor system according to the present embodiment. As is understood from comparison of FIG. 10 with FIG. 6B, the position etc. report processing performed by the sensor system according to the present embodiment is different from the position etc. report processing performed by the sensor system according to the background art in that steps S1 to S5 are added in the position etc. report processing performed by the sensor system according to the present embodiment. The following description will be made centering on the differences.

As illustrated in FIG. 10, the sensor system according to the present embodiment sets a value of an output replacement flag to False after performing step S131 (step S1). The output replacement flag is a variable that becomes False when the sensor controller 11 reports the pen pressure value P obtained in step S121 in FIG. 6A "as is," and which becomes True otherwise. An initial value of the output replacement flag is False, and an initial setting thereof is made in step S105 in FIG. 5.

The sensor system according to the present embodiment, when determining in step S130 that the position (x, y) is not a position within the effective region R1 (step S2), first determines whether or not the pen pressure value P is zero. When determining that the pen pressure value P is zero, the sensor system according to the present embodiment sets the value of the output replacement flag to True (step S3), and thereafter advances the processing to step S4. When determining that the pen pressure value P is not zero, the sensor system advances the processing to step S4 without changing the value of the output replacement flag.

In step S4, the sensor system determines the value of the output replacement flag (step S4). When determining as a result that the value of the output replacement flag is False, the sensor system outputs the corresponding position within the effective region R1 and the pen pressure value P to the host processor 7 in association with the local ID assigned during pairing (step S132). When determining that the value of the output replacement flag is True, on the other hand, the sensor system limits (e.g., prevents) the output of the pen pressure value P. Specifically, the sensor system outputs the corresponding position within the effective region R1 and a pen pressure value of zero (that is, a pen pressure value indicating noncontact) to the host processor 7 in association with the local ID assigned during pairing (step S5). Thus, when the pen tip of the stylus S is located outside the effective region R1 and after the pen pressure value P becomes zero even once, the pen pressure value of zero is reported in place of the pen pressure value P until the pen tip of the stylus S returns to the effective region R1.

FIG. 11 is a diagram illustrating an example (example 1-1) of a result of performing the position etc. report processing illustrated in FIG. 10. Movements of the stylus S in the present example are identical to those of the comparative example 1-2 illustrated in FIG. 9. A difference between the present example and the comparative example 1-2 lies in that contents of data output to the host processor 7 by the sensor controller 11 in response to the movements of the stylus S are different.

Specifically, during a period from time $t_7$ at which the pen pressure value P becomes zero till when the pen tip of the stylus S returns to the effective region R1, during which the pen tip of the stylus S is located outside the effective region R1, the pen pressure value P is output as is in the comparative example 1-2, whereas the pen pressure value of zero is output in the present example. Hence, the host processor 7 is prevented from generating a pen-down in response to a sharp rise in the pen pressure value P at time $t_9$.

As described above, the sensor system according to the present embodiment can prevent generation of a pen-down against the user's will when the pen tip of the stylus S is located outside the effective region R1. It is therefore possible to prevent the occurrence of an erroneous operation caused by an obstacle such as a level difference or a groove present within the detectable region R2, such as the erroneous tapping of the "close" button displayed at an edge of the display 3 and the like.

A few modifications of the present embodiment are conceivable. A first modification and a second modification of the present embodiment will be described in the following with reference to drawings.

Figure 12:
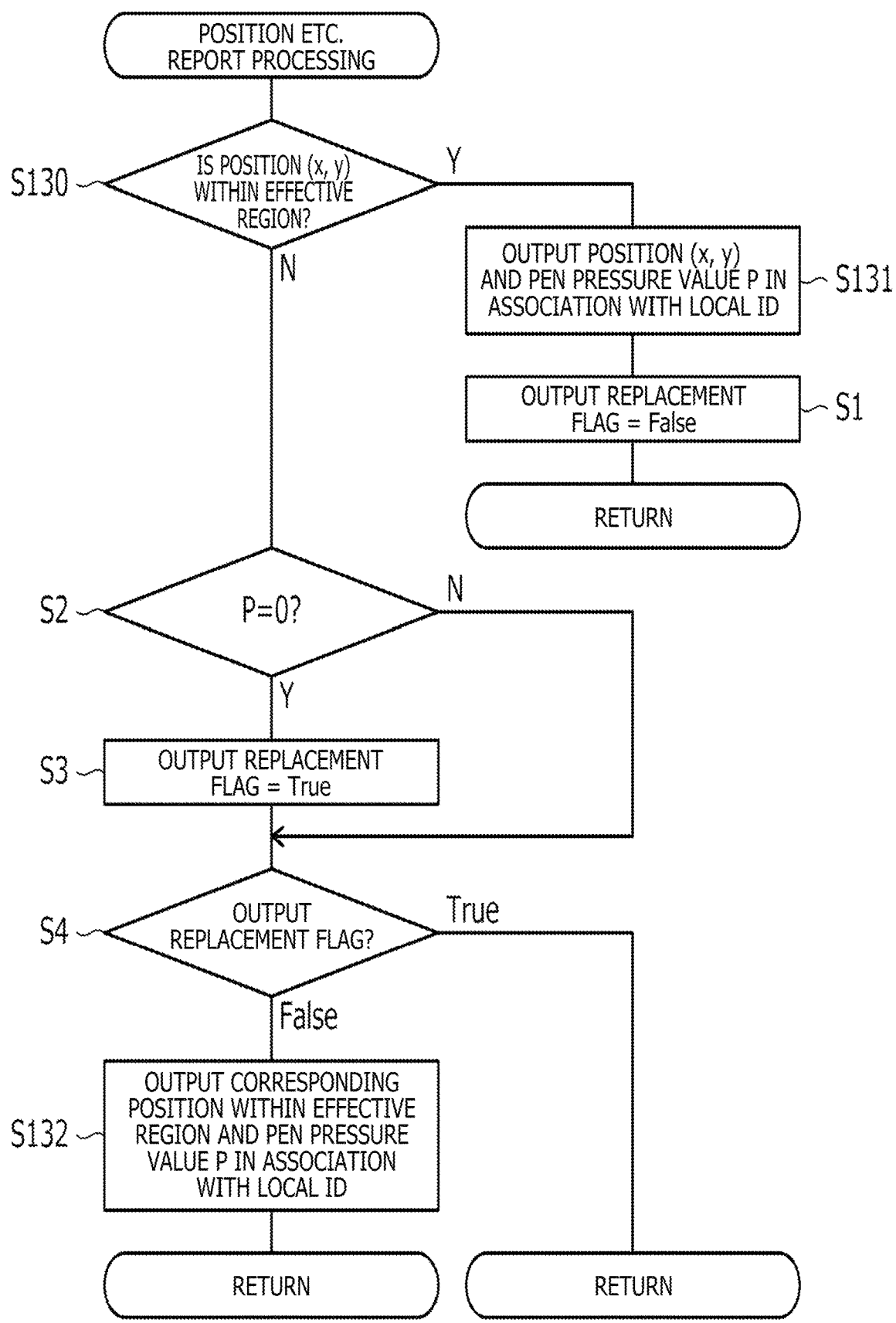
FIG. 12 is a diagram illustrating position etc. report processing performed by a sensor system according to a first modification of the first embodiment of the present invention.

FIG. 12 is a diagram illustrating position etc. report processing performed by a sensor system according to a first modification of the present embodiment. As is understood from comparison of FIG. 12 with FIG. 10, the sensor system according to the present modification is different from the sensor system according to the present embodiment in that the sensor system according to the present modification limits (e.g., prevents) the output of the pen pressure value P by not performing step S5. Because step S5 is not performed, when the pen pressure value P once becomes zero while the pen tip of the stylus S is located outside the effective region R1, the position (x, y) and the pen pressure value P are thereafter not supplied to the host processor 7 until the pen tip of the stylus S returns to the inside of the effective region R1. Hence, as in the present embodiment, the host processor 7 is prevented from generating a pen-down in response to a sharp rise in the pen pressure value P at time $t_9$.

FIG. 13 is a diagram illustrating an example (example 1-2) of a result of performing the position etc. report processing illustrated in FIG. 12. Movements of the stylus S in the present example are also identical to those of the comparative example 1-2 illustrated in FIG. 9. As illustrated in FIG. 13, in the present example, during a period from time $t_7$ at which the pen pressure value P becomes zero until when the pen tip of the stylus S returns to the effective region R1, during which the pen tip of the stylus S is located outside the effective region R1, the reporting of the position (x, y) and the pen pressure value P to the host processor 7 is stopped. While the reporting is stopped, the host processor 7 waits for the reporting to resume while maintaining the state of the stylus S. After the reporting is resumed, the host processor 7 resumes processing for movement of the cursor displayed on the screen, generation and drawing of stroke data, and the like.

As described above, the sensor system according to the present modification also can prevent the occurrence of a pen-down when the pen tip of the stylus S is located outside the effective region R1. Hence, as in the present embodiment, it is possible to prevent the occurrence of an erroneous operation caused by an obstacle such as a level difference or a groove present within the detectable region R2, such as the erroneous tapping of the "close" button displayed at an edge of the display 3 and the like.

Figure 14:
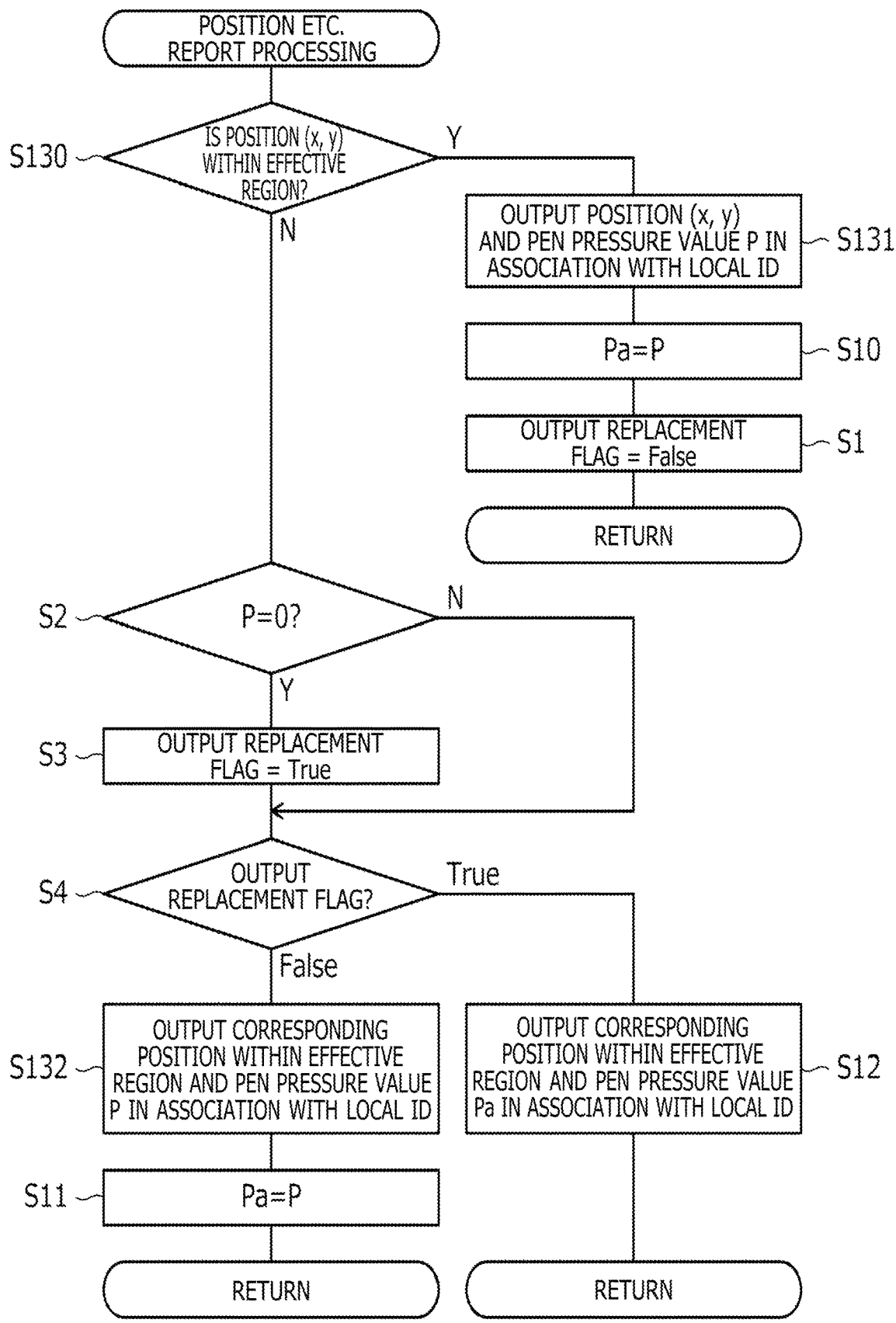
FIG. 14 is a diagram illustrating position etc. report processing performed by a sensor system according to a second modification of the first embodiment of the present invention.

FIG. 14 is a diagram illustrating position etc. report processing performed by a sensor system according to a second modification of the present embodiment. As is understood from comparison of FIG. 14 with FIG. 10, the sensor system according to the present modification is different from the sensor system according to the present embodiment in that the sensor system according to the present modification performs step S10 between step S131 and step S1, performs step S11 after step S132, and performs step S12 in place of step S5.

Steps S10 and S11 are each a step of assigning the pen pressure value P to a variable Pa. The variable Pa is a variable for temporarily storing the pen pressure value P. An initial value of the variable Pa is zero, and an initial setting thereof is made in step S105 in FIG. 5. Step S12 is different from step S5 illustrated in FIG. 10 in that step S12 limits (e.g., prevents) the output of the pen pressure value P by outputting a pen pressure value Pa (first value) in place of the pen pressure value of zero. According to these processing operations, when the pen pressure value P once becomes zero while the pen tip of the stylus S is located outside the effective region R1, the pen pressure value Pa (>0) immediately before the pen pressure value P becomes zero is thereafter output in place of a newly obtained pen pressure value P until the pen tip of the stylus S returns to the inside of the effective region R1. Hence, as in the present embodiment, the host processor 7 is prevented from generating a pen-down in response to a sharp rise in the pen pressure value P at time $t_9$.

Figure 15:
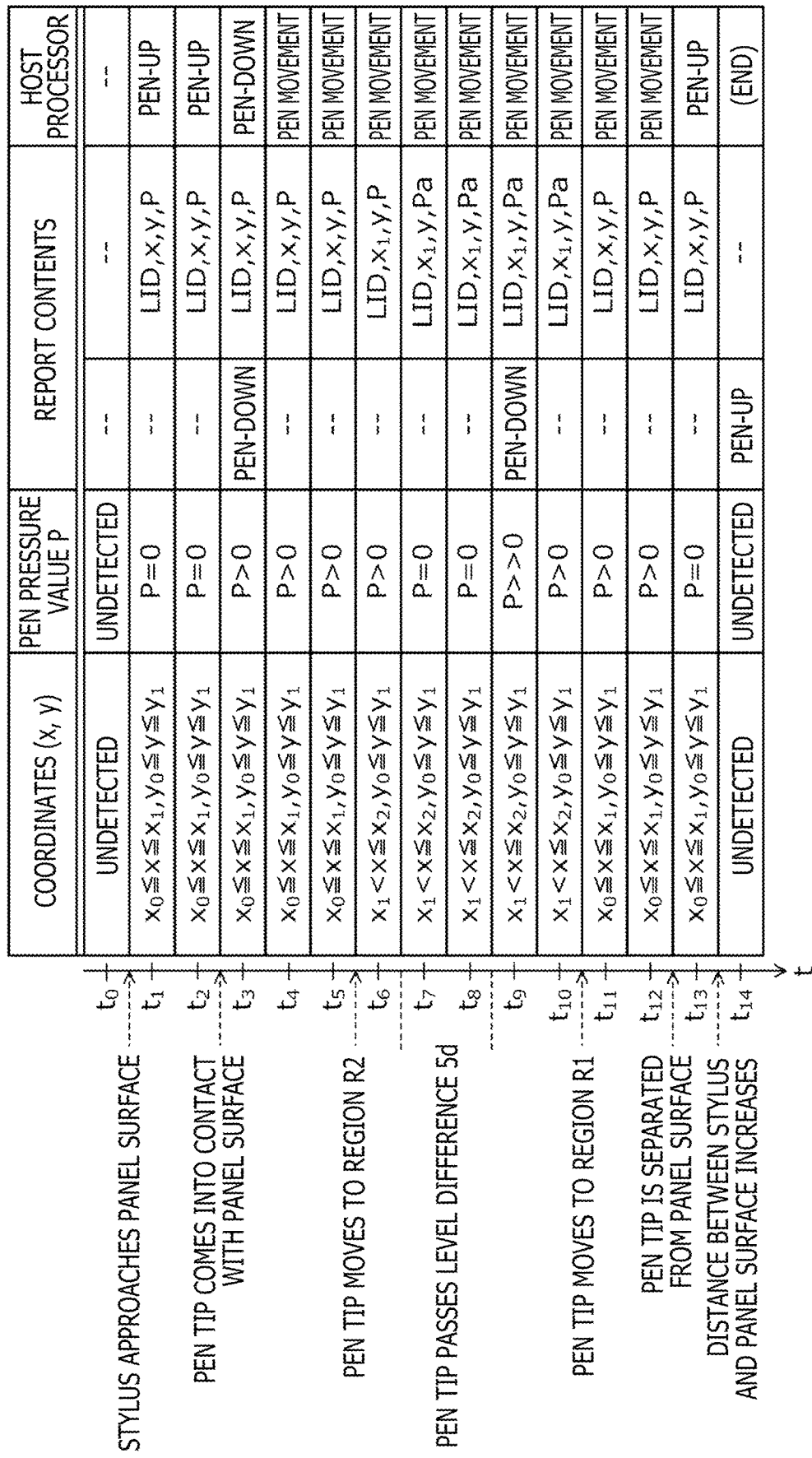
FIG. 15 is a diagram illustrating an example (example 1-3) of a result of performing the processing according to the present modification, wherein such processing is illustrated in FIG. 14.

FIG. 15 is a diagram illustrating an example (example 1-3) of a result of performing the position etc. report processing illustrated in FIG. 14. Movements of the stylus S in the present example are also identical to those of the comparative example 1-2 illustrated in FIG. 9. As illustrated in FIG. 15, in the present example, during a period from time $t_7$ at which the pen pressure value P becomes zero till when the pen tip of the stylus S returns to the effective region R1, during which the pen tip of the stylus S is located outside the effective region R1, the pen pressure value Pa is reported to the host processor 7 in place of the pen pressure value P. Hence, the pen pressure value P at time $t_9$ which rises sharply due to an effect of an obstacle such as a level difference or a groove is not reported to the host processor 7.

As described above, the sensor system according to the present modification also can prevent the occurrence of a pen-down when the pen tip of the stylus S is located outside the effective region R1. Hence, as in the present embodiment, it is possible to prevent the occurrence of an erroneous operation caused by an obstacle such as a level difference or a groove present within the detectable region R2, such as the erroneous tapping of the "close" button displayed at an edge of the display 3 and the like.

In the present embodiment, as in a second embodiment to be described later, the output of a pen-down does not have to be performed when the pen tip of the stylus S is located outside the effective region R1. This can prevent the occurrence of a pen-down when the pen tip of the stylus S is located outside the effective region R1 even if some application is performing processing according to the pen state supplied from the sensor controller 11.

Second Embodiment

A sensor system according to the second embodiment of the present invention will next be described. The sensor system according to the present embodiment is different from the sensor system according to the first embodiment in terms of timing at which the sensor controller 11 outputs a pen-up. In addition, processing performed by the host processor 7 is also different from that described in the first embodiment. The following description will be made with attention directed to these differences.

Figure 16:
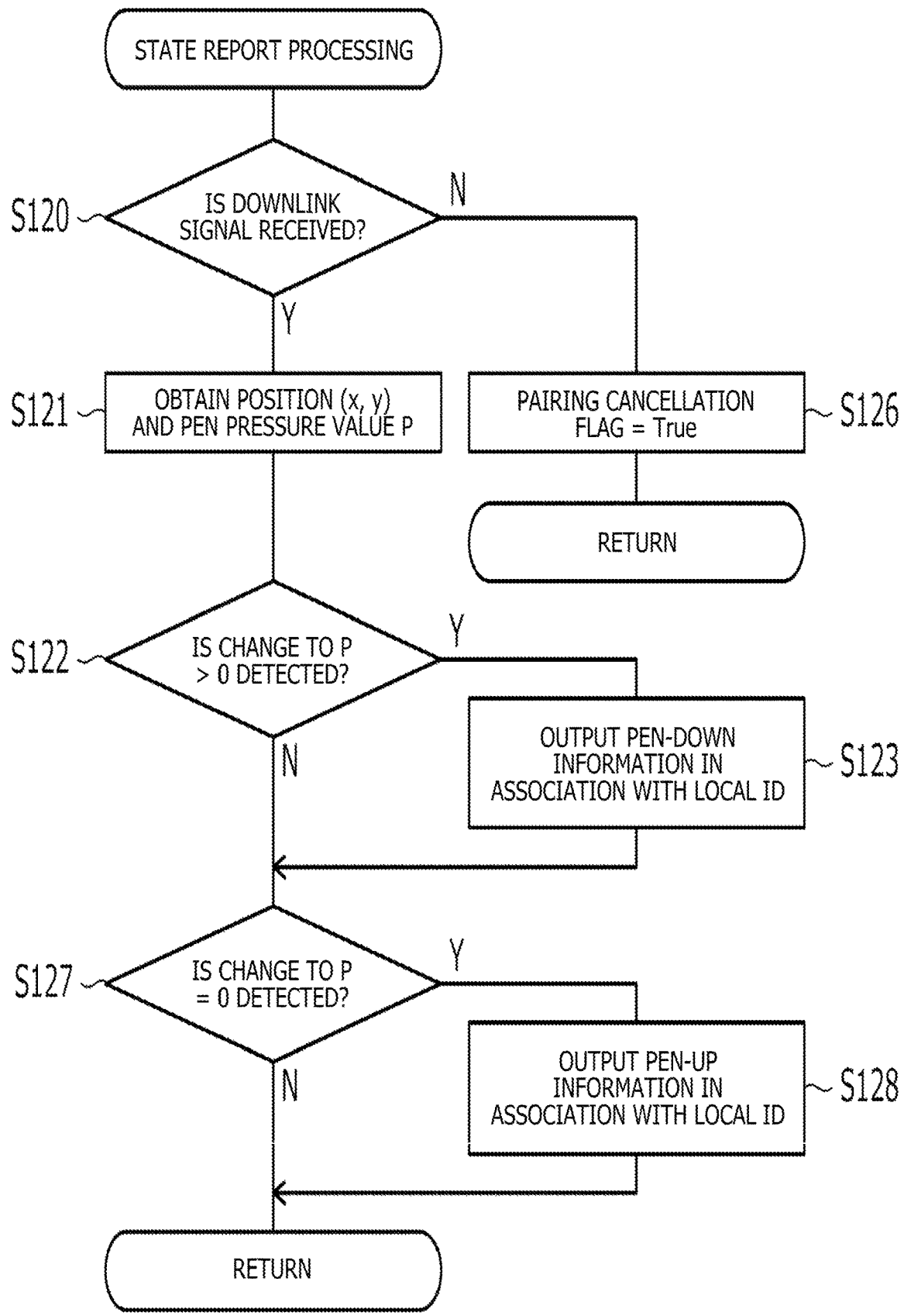
FIG. 16 is a diagram illustrating state report processing performed by a sensor system according to the background art, in relation to a second embodiment of the present invention.

FIG. 16 is a diagram illustrating state report processing performed by a sensor system according to the background art. The state report processing illustrated in FIG. 16 is different from the state report processing illustrated in FIG. 6A in that step S125 is not performed and in that steps S127 and S128 are added.

The sensor system according to the background art determines whether or not a change in the pen pressure value P from a value larger than zero to zero is detected (step S127) after the processing of steps S122 and S123 is ended. When it is determined that a change in the pen pressure value P from a value larger than zero to zero is detected, the above-described pen-up information is output to the host processor 7 in association with the local ID (step S128, a state output step). When it is determined that no change in the pen pressure value P from a value larger than zero to zero is detected, the state report processing is ended.

Unlike the host processor 7 according to the first embodiment, the host processor 7 according to the present embodiment is configured to use the pen state (a pen-up or a pen-down) supplied from the sensor controller 11 as the state of the stylus S. That is, the host processor 7 according to the present embodiment performs processing for movement of the cursor displayed on the screen, a tap operation, generation and drawing of stroke data, and the like, on the basis of the pen state supplied from the sensor controller 11.

FIG. 17 is a diagram illustrating a first example (comparative example 2-1) of a result of performing the processing according to the background art as illustrated in FIG. 16. Movements of the stylus S according to the present comparative example are similar to those of the comparative example 1-1 illustrated in FIG. 8. As illustrated in FIG. 17, in the present comparative example, pen-up information is reported to the host processor 7 in response to the pen pressure value P becoming zero at time $t_{13}$. As a result, the state of the stylus S which is internally possessed by the host processor 7 is the same as in the comparative example 1-1 of FIG. 8.

FIG. 18 is a diagram illustrating a second example (comparative example 2-2) of a result of performing the processing according to the background art as illustrated in FIG. 16. Movements of the stylus S according to the present comparative example are similar to those of the comparative example 1-2 illustrated in FIG. 9. As illustrated in FIG. 18, in the present comparative example, pen-up information is reported to the host processor 7 at each of times $t_7$ and $t_{13}$. As a result, the state of the stylus S which is internally possessed by the host processor 7 is the same as in the comparative example 1-2 of FIG. 9.

Here, the first embodiment prevents the occurrence of a pen-down when the pen tip of the stylus S is located outside the effective region R1 by changing the output content of the pen pressure value P or stopping the output of the pen pressure value P. In the present embodiment, on the other hand, the processing of the host processor 7 is different, and therefore the occurrence of a pen-down when the pen tip of the stylus S is located outside the effective region R1 cannot be prevented by the same method as in the first embodiment. Accordingly, the sensor system according to the present embodiment prevents the occurrence of a pen-down when the pen tip of the stylus S is located outside the effective region R1 by stopping the output of the pen state from the sensor controller 11. Description will be made in detail in the following.

Figure 19:
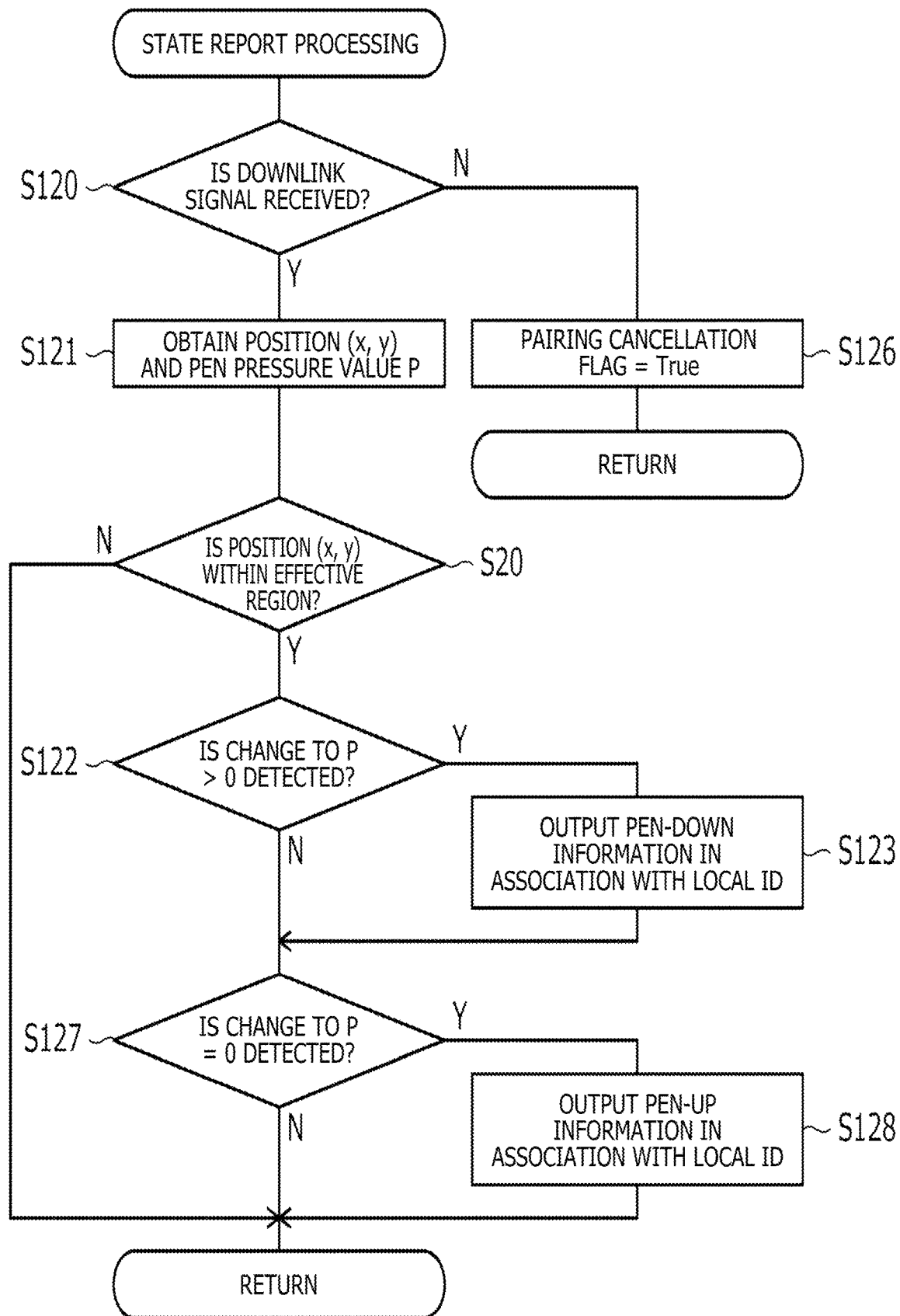
FIG. 19 is a diagram illustrating state report processing performed by a sensor system according to the second embodiment of the present invention.

FIG. 19 is a diagram illustrating state report processing performed by the sensor system according to the present embodiment. As is understood from comparison of FIG. 19 with FIG. 16, the state report processing performed by the sensor system according to the present embodiment is different from the state report processing performed by the sensor system according to the background art in that step S20 is added in the state report processing performed by the sensor system according to the present embodiment.

Step S20 is a step of determining whether or not the position (x, y) obtained in step S121 is a position within the effective region R1. When the sensor system according to the present embodiment determines in the step S20 that the position (x, y) obtained in step S121 is a position within the effective region R1, the sensor system performs the processing of steps S122 and S127 as in the sensor system according to the background art. When the sensor system according to the present embodiment determines that the position (x, y) obtained in step S121 is not a position within the effective region R1, on the other hand, the sensor system skips the processing of steps S122 and S127. Thus, when the position (x, y) is not a position within the effective region R1, the pen state is not reported from the sensor controller 11 to the host processor 7.

FIG. 20 is a diagram illustrating an example (example 2) of a result of performing the state report processing illustrated in FIG. 19. Movements of the stylus S in the present example are identical to those of the comparative example 2-2 illustrated in FIG. 18. A difference between the present example and the comparative example 2-2 lies in that the contents of the pen state output to the host processor 7 by the sensor controller 11 in response to the movements of the stylus S is different.

Specifically, during a period from time $t_6$ to time $t_{10}$ during which the pen tip of the stylus S is located outside the effective region R1, a pen-up and a pen-down are each output once in the comparative example 2-2, whereas the pen-up and the pen-down are not output even once in the present example. This prevents an occurrence of an operation triggered by a pen-down due to a sharp rise in the pen pressure value P at time $t_9$.

As described above, the sensor system according to the present embodiment also can prevent the occurrence of a pen-down against the user's will when the pen tip of the stylus S is located outside the effective region R1. Hence, as in the first embodiment, it is possible to prevent the occurrence of an erroneous operation caused by an obstacle such as a level difference or a groove present within the detectable region R2, t such as the erroneous tapping of the "close" button displayed at an edge of the display 3 and the like.

Also in the present embodiment, as described in the first embodiment and the first and second modifications thereof, processing such as changing the output content of the pen pressure value P or stopping the output of the pen pressure value P may be performed when the pen tip is located outside the effective region R1.

Third Embodiment

A sensor system according to a third embodiment of the present invention will next be described.

Figure 21:
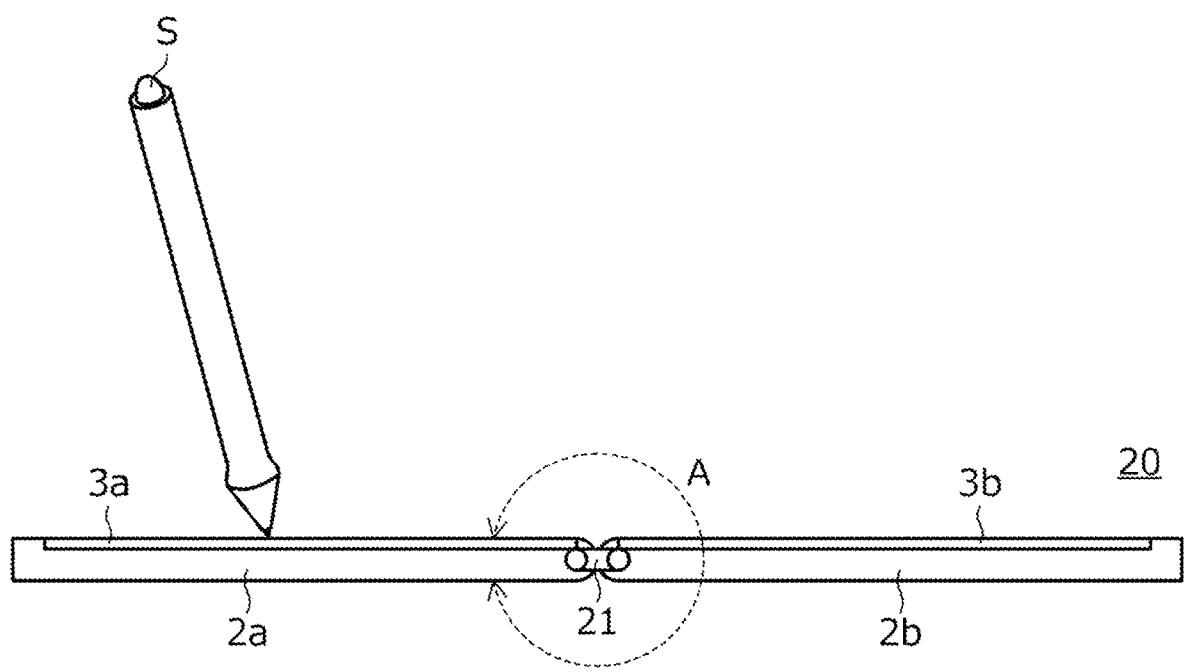
FIG. 21 is a diagram illustrating a tablet terminal according to a third embodiment of the present invention.

FIG. 21 is a diagram illustrating a tablet terminal 20 according to the present embodiment. The tablet terminal 20 is the above-described dual screen model. The tablet terminal 20 has a configuration in which a casing 2a having a display 3a (first display) and a casing 2b having a display 3b (second display) are connected to each other via a hinge 21. The casing 2b is configured to be rotatable 360 degrees along an arrow A illustrated in the figure about the hinge 21.

The displays 3a and 3b are each configured to support both pen input and touch input. Pen input is realized when a user slides a pen tip of a stylus S on the displays 3a and 3b, and sensor controllers 11a and 11b (see FIG. 22) to be described later detect a trajectory of the pen tip of the stylus S. Touch input is realized when the user slides a finger F of the user on the displays 3a and 3b, and the sensor controllers 11a and 11b (see FIG. 22) to be described later detect a trajectory of the finger F.

Figure 22:
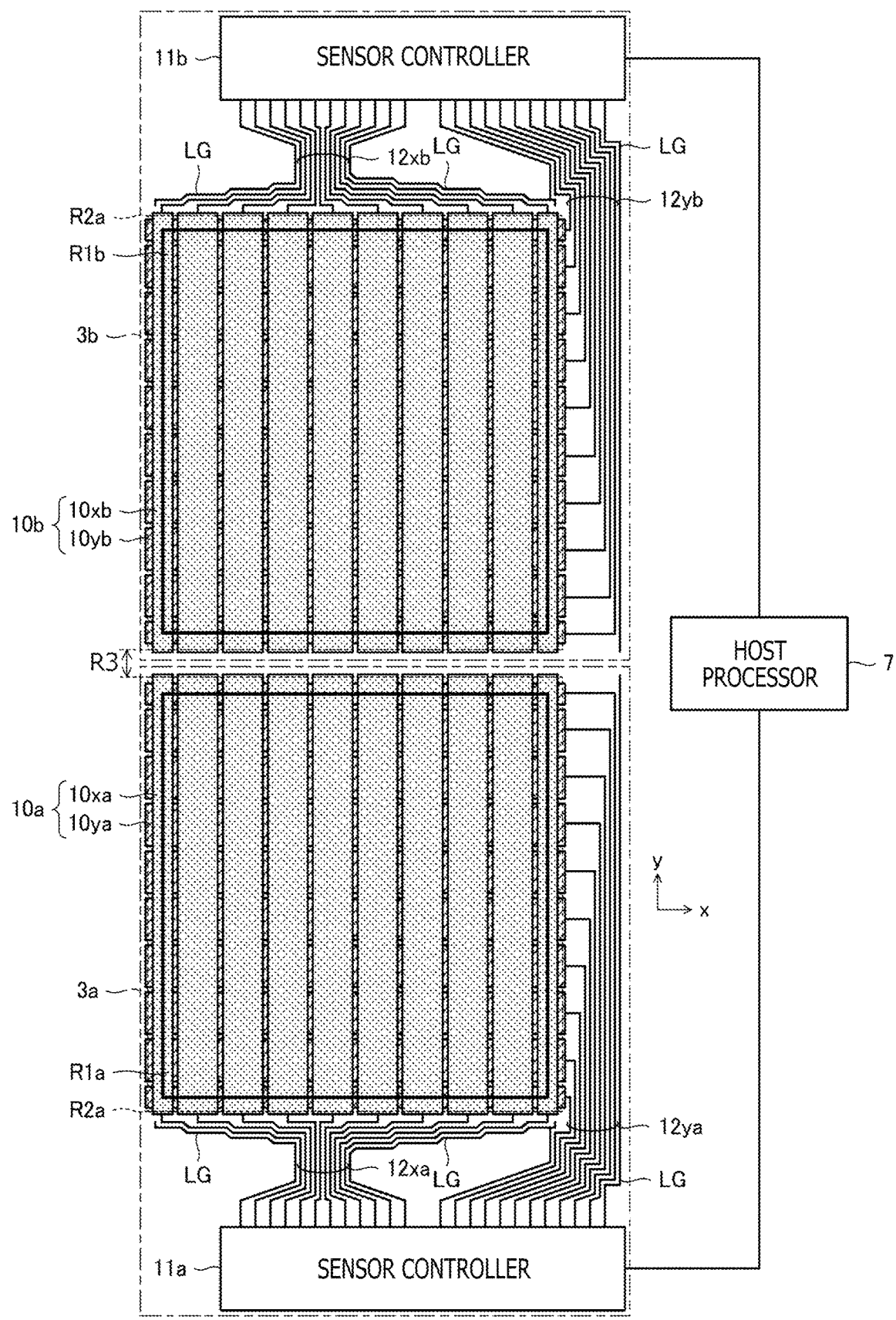
FIG. 22 is a diagram illustrating an internal configuration of the tablet terminal illustrated in FIG. 21.

FIG. 22 is a diagram illustrating an internal configuration of the tablet terminal 20. FIG. 22 illustrates only parts related to pen input and touch input in the displays 3a and 3b. As illustrated in FIG. 22, the tablet terminal 20 also includes a host processor 7. The host processor 7 is a central processing unit that controls various parts of the tablet terminal 20. The host processor 7 plays a role of reading and executing programs stored in a memory not illustrated. The programs executed by the host processor 7 include an operating system of the tablet terminal 20, various kinds of drawing applications, various kinds of communication programs, and the like.

The display 3a includes a sensor 10a including a plurality of sensor electrodes 10xa and a plurality of sensor electrodes 10ya, a sensor controller 11a, a plurality of routing lines 12xa for connecting each sensor electrode 10xa to the sensor controller 11a, a plurality of routing lines 12ya for connecting each sensor electrode 10ya to the sensor controller 11a, and guard wiring LG for isolating each of the routing lines 12xa and 12ya from an external environment. Similarly, the display 3b includes a sensor 10b including a plurality of sensor electrodes 10xb and a plurality of sensor electrodes 10yb, a sensor controller 11b, a plurality of routing lines 12xb for connecting each sensor electrode 10xb to the sensor controller 11b, a plurality of routing lines 12yb for connecting each sensor electrode 10yb to the sensor controller 11b, and guard wiring LG for isolating each of the routing lines 12xb and 12yb from the external environment.

The routing lines 12xa and 12xb are each connected to an end portion, which is on a side farther from the hinge 21 illustrated in FIG. 21 of the two ends in the y-direction, of the corresponding sensor electrode 10xa or 10xb. The routing lines 12xa and 12xb are configured in this manner in order to make a distance between the screens of the displays 3a and 3b as short as possible.

The sensor controllers 11a and 11b are each an integrated circuit configured to be able to perform various processing operations. The processing operations performed by the sensor controllers 11a and 11b include processing of detecting positions of the stylus S and the finger F within panel surfaces of the displays 3a and 3b and receiving data transmitted by the stylus S, and reporting the detected positions and the received data to the host processor 7. The sensor controllers 11a and 11b and the host processor 7 constitute a sensor system according to the present invention. Each processing operation to be described later is performed by one or more of the sensor controllers 11a and 11b and the host processor 7.

As with the sensor controller 11 according to the first embodiment, the sensor controllers 11a and 11b are each configured to be able to communicate bidirectionally with the stylus S via the sensors 10a and 10b. In the following, signals transmitted by the sensor controllers 11a and 11b to the stylus S will be referred to as "uplink signals," and signals transmitted by the stylus S to the sensor controllers 11a and 11b will be referred to as "downlink signals."

As illustrated in FIG. 22, the display 3a includes an effective region R1a and a detectable region R2a. The effective region R1a is a region corresponding to the panel surface of the display 3a. The detectable region R2a is a region outside the effective region R1a in a region in which the sensor controller 11a can detect the stylus S. The detectable region R2a is disposed so as to enclose the effective region R1a.

Similarly, the display 3b includes an effective region R1b and a detectable region R2b. The effective region R1b is a region corresponding to the panel surface of the display 3b. The detectable region R2b is a region outside the effective region R1b in a region in which the sensor controller 11b can detect the stylus S. The detectable region R2b is disposed so as to enclose the effective region R1b.

A non-sensitive region R3 that cannot detect the stylus S is formed between the detectable region R2a and the detectable region R2b. When the pen tip of the stylus S is present within the non-sensitive region R3, neither of the sensor controllers 11a and 11b can receive a downlink signal from the stylus S.

Processing performed by the sensor system according to the background art is similar to the processing described with reference to FIG. 5 and FIGS. 6A and 6B. The sensor controllers 11a and 11b and the host processor 7 according to the background art are configured to treat the displays 3a and 3b as one touch surface, by communicating with each other as needed. Specifically, information regarding the stylus S paired with one of the sensor controllers 11a and 11b is configured to be shareable by the other of the sensor controllers 11a and 11b.

In addition, as in the first embodiment, the host processor 7 according to the present embodiment is configured to determine the state of the stylus S on the basis of the pen pressure value P supplied from the sensor controllers 11a and 11b, and to end the processing related to the stylus S when pen-up information is reported from the sensor controllers 11a and 11b.

Figure 23:
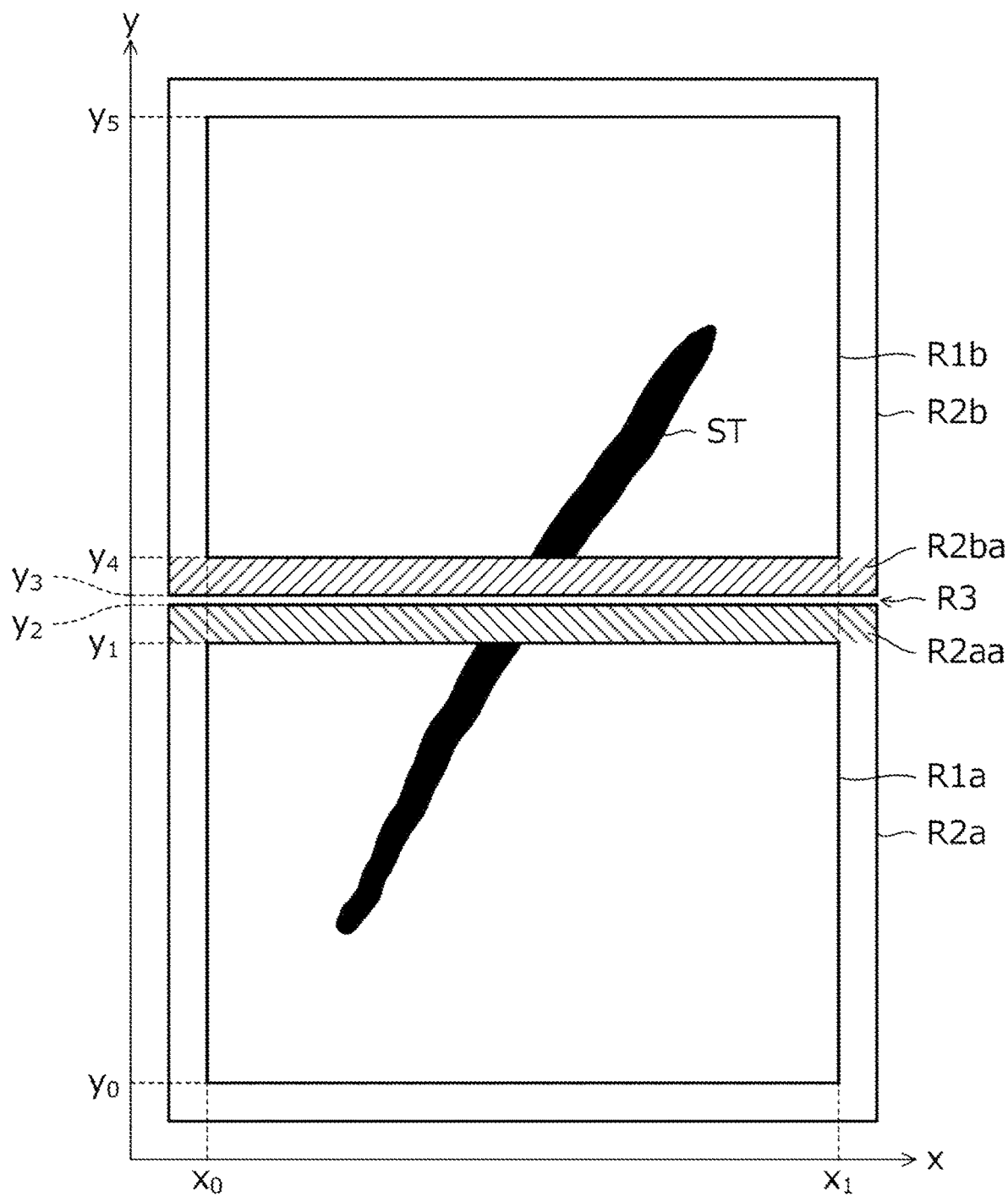
FIG. 23 is a diagram explaining problems of the third embodiment of the present invention.

FIG. 23 is a diagram explaining potential problems that can be solved by the present embodiment. FIG. 23 illustrates a case where a surface of the casing 2b is disposed at a position of 180 degrees relative to a surface of the casing 2a (see FIG. 21). Stroke data ST illustrated in the FIG. 23 is an example of stroke data that a user of the tablet terminal 20 may desire to draw. The stroke data ST constitutes one continuous line drawing that straddles the displays 3a and 3b. With the sensor system according to the background art, even when such stroke data ST is to be drawn by using the stylus S, a pen-up not intended by the user may occur between the displays 3a and 3b (for example due to a level difference or a small groove) and pairing may be canceled, and as a result the stroke data ST may become two different stroke data for the respective displays 3a and 3b (as opposed to one stroke data straddling the displays 3a and 3b as shown in FIG. 23). Specifically, this is due to the presence of an obstacle, such as a level difference or a groove between the displays 3a and 3b, and the presence of the non-sensitive region R3. Hence, an aspect of the sensor system according to the present embodiment is to prevent the occurrence of a pen-up not intended by the user between the displays 3a and 3b and prevent the cancellation of pairing, and thereby enable the drawing of one stroke data straddling the displays 3a and 3b, such as the stroke data ST (one stroke data) illustrated in FIG. 23.

FIG. 23 also illustrates coordinates to be used in the following description. As illustrated in FIG. 23, in the following description, an arrangement direction of the effective regions R1a and R1b is set as a y-direction, and a direction orthogonal to the y-direction is set as an x-direction. An x-coordinate of one end in the x-direction of the effective region R1a and an x-coordinate of another end in the x-direction of the effective region R1a are set as $x_0$ and $x_1$, respectively. In this case, an x-coordinate of one end in the x-direction of the effective region R1b and an x-coordinate of another end in the x-direction of the effective region R1b are also $x_0$ and $x_1$, respectively. Further, a y-coordinate of one end in the y-direction of the effective region R1a, a y-coordinate of another end in the y-direction of the effective region R1a, a y-coordinate of another end in the y-direction of the detectable region R2a (end portion on the effective region R1b side), a y-coordinate of one end in the y-direction of the detectable region R2b (end portion on the effective region R1a side), a y-coordinate of one end in the y-direction of the effective region R1b, and a y-coordinate of another end in the y-direction of the effective region R1b are set as $y_0$, $y_1$, $y_2$, $y_3$, $y_4$, and $y_5$, respectively.

In the following description, a region satisfying $y_1 \leq y \leq y_2$ in the detectable region R2a may be particularly referred to as a specific detectable region R2aa, and a region satisfying $y_3 \leq y \leq y_4$ in the detectable region R2b may be particularly referred to as a specific detectable region R2ba. In FIG. 23, these specific detectable regions R2aa and R2ba are indicated clearly by hatching.

FIG. 24 is a diagram illustrating an example (comparative example 3) of a result of performing processing according to the background art. Times $t_0$ to $t_{17}$ illustrated in FIG. 24 correspond to timings of transmission of a downlink signal by the stylus S. The stylus S according to the present comparative example approaches the display 3a from above the effective region R1a between time $t_0$ and time $t_1$, comes into contact with the panel surface of the display 3a between times $t_2$ and $t_3$, and thereafter moves to the specific detectable region R2aa between times $t_5$ and $t_6$ while maintaining the contact state. Then, the stylus S sequentially moves to the non-sensitive region R3 between times $t_5$ and $t_9$, to the specific detectable region R2ba between times $t_{10}$ and $t_{11}$, and to the effective region R1b between times $t_{13}$ and $t_{14}$, and separates from the panel surface of the display 3b after the passage of time $t_{15}$.

As illustrated in FIG. 24, when the stylus S approaches the display 3a, the sensor controller 11a becomes able to obtain the position (x, y) and the pen pressure value P at time $t_1$ after the above-described pairing. At this time point, the pen tip of the stylus S is not in contact with the panel surface yet, and therefore the pen pressure value P is zero. In addition, the stylus S is located above the effective region R1a, and therefore the detected position (x, y) satisfies $x_0 \leq x \leq x_1$ and $y_0 \leq y \leq y_1$.

When the pen tip of the stylus S thereafter comes into contact with the effective region R1a between times $t_2$ and $t_3$, the pen pressure value P changes to a value larger than zero at time $t_3$. When the pen tip of the stylus S next moves to the specific detectable region R2aa between times $t_5$ and $t_6$, the detected position (x, y) changes to a position within the specific detectable region R2aa at time $t_6$.

FIG. 24 illustrates a case where there is an obstacle such as a level difference or a groove within the specific detectable region R2aa. Due to effects of this obstacle, the pen pressure value P temporarily becomes zero at time $t_7$, and the pen pressure value P temporarily becomes a large value at time $t_5$.

When the pen tip of the stylus S moves to the non-sensitive region R3 between times $t_5$ and $t_9$, neither of the sensor controllers 11a and 11b can receive a downlink signal from the stylus S, and therefore none of the position (x, y) and the pen pressure value P are detected. Thus, pairing with the stylus S is temporarily canceled in step S110 in FIG. 5.

When the pen tip of the stylus S thereafter enters the specific detectable region R2ba between times $t_{10}$ and $t_{11}$, pairing is performed again, and the detected position (x, y) changes to a position within the specific detectable region R2ba at time $t_{11}$. Further, when the pen tip of the stylus S enters the effective region R1b between times $t_{13}$ and $t_{14}$, the detected position (x, y) changes to a position within the effective region R1b at time $t_{14}$. FIG. 23 illustrates a case where there is no obstacle such as a level difference or a groove within the specific detectable region R2ba. However, needless to say, there is a possibility of the presence of an obstacle such as a level difference or a groove within the specific detectable region R2*ba*. In that case, changes in the pen pressure value P that are similar to those at times $t_7$ and $t_8$ are observed.

When the pen tip of the stylus S separates from the panel surface between times tis and $t_{16}$, the pen pressure value P changes to zero at time $t_{16}$. When a distance between the stylus S and the panel surface then increases between times $t_{16}$ and $t_{17}$, the downlink signal does not reach the sensor 10*b* at time $t_{17}$, and the sensor controller 11*b* becomes unable to obtain the position (x, y) and the pen pressure value P again.

During a period from time $t_1$ to time $t_5$, the sensor controller 11*a* outputs the position (x, y) and the pen pressure value P to the host processor 7 in association with a first local ID (written as "LID1" in FIG. 24 and the following figures). In addition, during a period from time $t_{11}$ to time $t_{16}$, the sensor controller 11*b* outputs the position (x, y) and the pen pressure value P to the host processor 7 in association with a second local ID (written as "LID2" in FIG. 24 and the following figures). However, during a period from time $t_6$ to time $t_8$ and a period from time $t_{11}$ to time $t_{13}$ during which the pen tip of the stylus S is located within the detectable region R2*a* or R2*b*, the corresponding position (the position $y_1$ or the position $y_4$) within the effective region is output in place of the obtained position y.

The host processor 7 determines that a pen-down has occurred on the basis of changes in the pen pressure value P to a value larger than zero at times $t_3$, $t_5$, and $t_{11}$. The host processor 7 determines that the stylus S is in the state of a pen-up at times $t_1$, $t_2$, $t_7$, and $t_{16}$ at which the pen pressure value P is zero. The sensor controllers 11*a* and 11*b* report pen-up information at times $t_9$ and $t_{17}$ at which the downlink signal becomes unable to be received. The host processor 7 thereby ends the processing related to the stylus S at each of times $t_9$ and $t_{17}$.

The pen-up occurring at time $t_7$ as well as pairing cancellation and the ending of the processing related to the stylus S in the host processor 7 at time $t_9$ are not intended by the user trying to draw the stroke data ST illustrated in FIG. 23. As a result, the line drawing intended by the user is broken against the user's will.

The sensor system according to the present embodiment prevents the line drawing from being broken as described above, by concealing the occurrence of a pen-up from the host processor 7 and delaying pairing cancellation when the obtained position (x, y) is outside the effective region R1. Processing performed by the sensor system according to the present embodiment for that purpose will be described in detail in the following.

Figure 25:
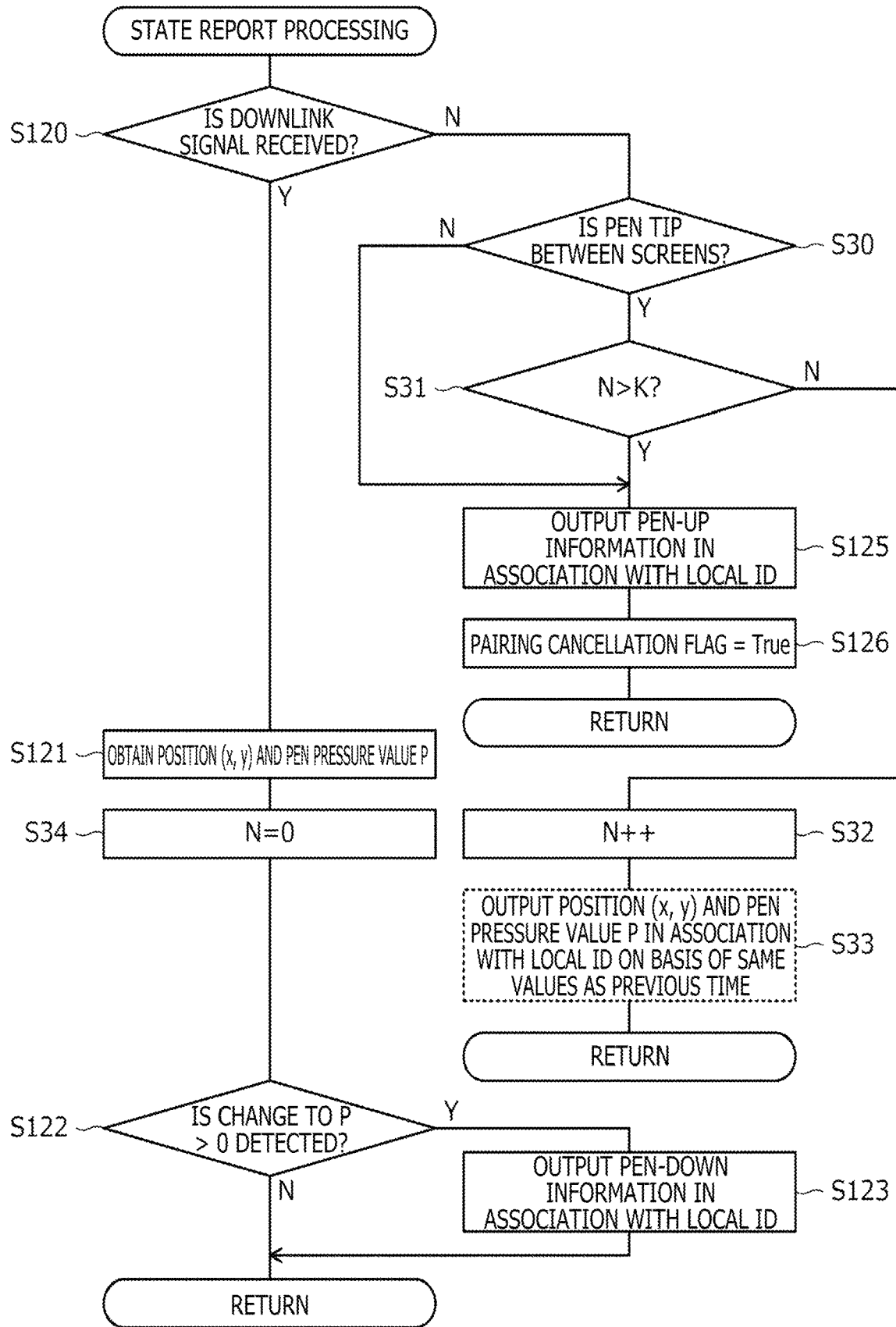
FIG. 25 is a diagram illustrating state report processing performed by a sensor system according to the third embodiment of the present invention.

FIG. 25 is a diagram illustrating state report processing performed by the sensor system according to the present embodiment. As is understood from comparison of FIG. 25 with FIG. 6A, the state report processing performed by the sensor system according to the present embodiment is different from the state report processing performed by the sensor system according to the background art in that steps S30 to S34 are added in the state report processing performed by the sensor system according to the present embodiment. The following description will be made centering on the differences.

As illustrated in FIG. 25, when the sensor system according to the present embodiment determines in step S120 that the downlink signal cannot be received, the sensor system first determines whether or not the pen tip of the stylus S is located in a region between the screens of the display 3*a* and the display 3*b* (between panel surfaces) (step S30, a determining step). It suffices for the sensor system to make a result of the determination in step S30 positive when the last obtained position (x, y) is located in one of the specific detectable regions R2*aa* and R2*ba*, and make the result of the determination in step S30 negative otherwise.

Upon obtaining a negative result in step S30, the sensor system performs steps S125 and S126 described with reference to FIG. 6A, and then ends the state report processing. Consequently, pairing with the stylus S is canceled in step S110 in FIG. 5.

Upon obtaining a positive result in step S30, on the other hand, the sensor system determines whether or not a variable N is larger than a predetermined value K (step S31). An initial value of the variable N is zero, and an initial setting thereof is made in step S105 in FIG. 5. When determining in step S31 that the variable N is larger than the predetermined value K, the sensor system performs steps S125 and S126, and then ends the state report processing. Consequently, pairing with the stylus S is canceled in step S110 in FIG. 5. When determining in step S31 that the variable N is not larger than the predetermined value K, on the other hand, the sensor system increments the variable N by one (step S32). As a result of these processing operations, the output of pen-up information and pairing cancellation are delayed for a predetermined period defined by the predetermined value K.

The sensor system may end the state report processing immediately after ending step S32. However, as indicated by a broken line in FIG. 25, the sensor system may also output the position (x, y) and the pen pressure value P to the host processor 7 in association with the local ID on the basis of the same values as the previous time (step S33, a previous value output step). This makes it possible to continue to output a valid position (x, y) and a valid pen pressure value P to the host processor 7 even when the pen tip of the stylus S is located within the non-sensitive region R3.

In addition, when the sensor system according to the present embodiment determines in step S120 that a downlink signal is received, the sensor system obtains the position (x, y) and the pen pressure value P in step S121, and assigns zero to the above-described variable N (step S34). The sensor system thereafter performs the processing of steps S122 and S123 as in FIG. 6A, and then ends the state report processing.

Figure 26:
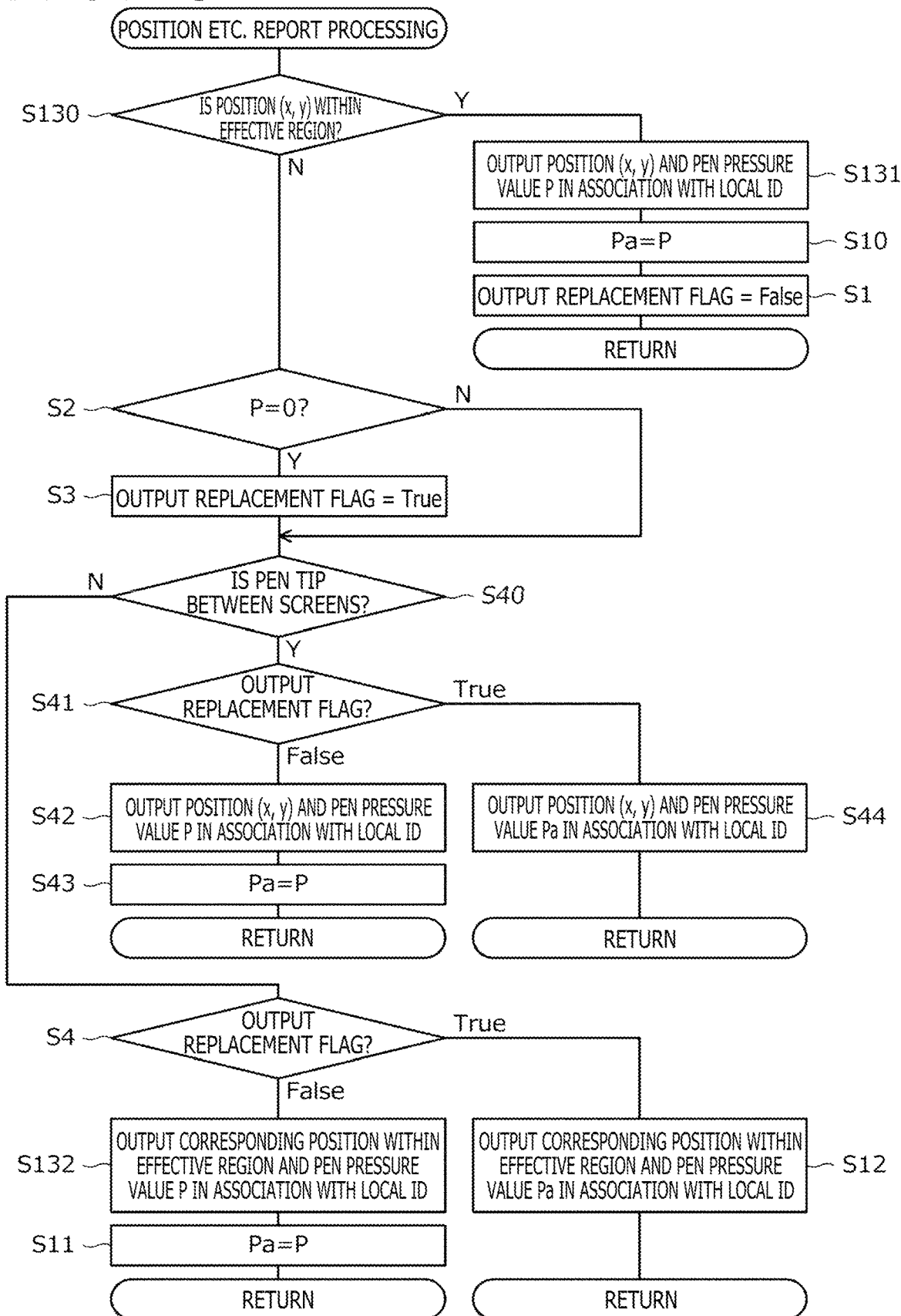
FIG. 26 is a diagram illustrating position etc. report processing performed by the sensor system according to the third embodiment of the present invention.

FIG. 26 is a diagram illustrating position etc. report processing performed by the sensor system according to the present embodiment. As is understood from comparison of FIG. 26 with FIG. 14, the position etc. report processing performed by the sensor system according to the present embodiment is obtained by adding steps S40 to S44 to the position etc. report processing according to the second modification of the first embodiment as illustrated in FIG. 14. The following description will be made centering on the differences from FIG. 14.

The sensor system according to the present embodiment determines whether or not the pen tip of the stylus S is located in a region between the screens of the display 3*a* and the display 3*b* (between the panel surfaces) after performing the processing of steps S2 and S3 (step S40). This is processing similar to step S30 illustrated in FIG. 25.

When obtaining a negative result in step S40, the sensor system performs the processing of steps S4, S132, S11, and S12 as in FIG. 14. When obtaining a positive result in step S40, on the other hand, the sensor system first determines the value of the output replacement flag (step S41). When determining as a result that the value of the output replacement flag is False, the sensor system outputs the position (x, y) and the pen pressure value P to the host processor 7 in association with the local ID assigned during pairing (step S42). Then, the sensor system assigns the pen pressure value P to the variable Pa (step S43), and ends the position etc. report processing. When determining that the value of the output replacement flag is True, on the other hand, the sensor system outputs the position (x, y) and the pen pressure value Pa to the host processor 7 in association with the local ID assigned during pairing (step S44).

According to the above processing, when the pen tip of the stylus S is present in a region that is outside the effective regions R1a and R1b and is also outside the specific detectable regions R2aa and R2ba, as in the second modification of the first embodiment, the corresponding position within the effective region R1a or R1b and the pen pressure value P are output until the pen pressure value P becomes zero, and when the pen pressure value P once becomes zero, the pen pressure value Pa (>0) immediately before the pen pressure value P becomes zero is thereafter output in place of a newly obtained pen pressure value P together with the corresponding position within the effective region R1a or R1b. When the pen tip of the stylus S is present within the specific detectable region R2aa or R2ba, on the other hand, similar processing to the above is performed for the pen pressure value, whereas the position (x, y) obtained in step S121 in FIG. 25 rather than the corresponding position within the effective region R1a or R1b is output.

FIG. 27 is a diagram illustrating an example (example 3) of a result of performing the processing according to the present embodiment as illustrated in FIG. 25 and FIG. 26. Movements of the stylus S in the present example are identical to those of the comparative example 3 illustrated in FIG. 24. As illustrated in FIG. 27, in the present example, pen-up information is not output nor is pairing canceled at times $t_9$ and $t_{10}$ at which the pen tip of the stylus S is located within the non-sensitive region R3. After time $t_7$ at which the pen pressure value P once becomes zero during a period from time $t_6$ to time $t_{13}$ during which the pen tip of the stylus S is located outside the effective regions R1a and R1b, the pen pressure value Pa (equal to the pen pressure value P at time $t_6$) is supplied to the host processor 7 in place of the pen pressure value P. Hence, at time $t_9$, pairing is not canceled, nor is the processing related to the stylus S in the host processor 7 temporarily ended. Also, the host processor 7 does not generate a pen-up at time $t_7$. Thus, the stroke data ST illustrated in FIG. 23 is prevented from being broken between the displays 3a and 3b.

In addition, according to the present embodiment, during a period from time $t_6$ to time $t_8$ during which the pen tip of the stylus S is located within the specific detectable region R2aa and during a period from time $t_{11}$ to time $t_{13}$ during which the pen tip of the stylus S is located in the specific detectable region R2ba, coordinates within the specific detectable regions R2aa and R2ba rather than the corresponding positions within the effective regions R1a and R1b are supplied to the host processor 7. The host processor 7 can therefore smoothly generate stroke data straddling the displays 3a and 3b. According to the present embodiment, during a period from time $t_9$ to time $t_{10}$ during which the pen tip of the stylus S is located within the non-sensitive region R3, the position (x, y) and the pen pressure value P can continue being output in association with the local ID on the basis of the same values as the previous time. Consequently, the host processor 7 can generate the stroke data straddling the displays 3a and 3b more smoothly.

As described above, with the sensor system according to the present embodiment, no pen-up occurs and pairing is not canceled when the pen tip of the stylus S is located between the screens. Thus, one line can be drawn so as to straddle the displays 3a and 3b. In addition, while the pen tip of the stylus S is located within the specific detectable regions R2aa and R2ba, coordinates within the specific detectable regions R2aa and R2ba rather than the corresponding positions within the effective regions R1a and R1b are supplied to the host processor 7, and while the pen tip of the stylus S is located within the non-sensitive region R3, the position (x, y) and the pen pressure value P can continue being output. It is therefore possible to generate the stroke data straddling the displays 3a and 3b smoothly.

In addition, with the sensor system according to the present embodiment, as for a region other than between the screens, as in the first embodiment and the like, a pen-down can be prevented from occurring against the user's will when the pen tip of the stylus S is located outside the effective region R1. It is therefore possible to prevent the occurrence of an erroneous operation caused by an obstacle such as a level difference or a groove present within the detectable regions R2a and R2b, such as an erroneous tapping of the "close" button displayed at edges of the displays 3a and 3b and the like.

While the pen pressure value Pa is output in steps S44 and S12 in FIG. 26 in the present embodiment, the pen pressure value of zero may be output as in the first embodiment, or the pen pressure value need not be output as in the first modification of the first embodiment.

Fourth Embodiment

A sensor system according to a fourth embodiment of the present invention will next be described. The sensor system according to the present embodiment is different from the sensor system according to the third embodiment in terms of timing at which the sensor controller 11 outputs pen-up information. In addition, processing performed by the host processor 7 is also different from that described in the third embodiment. The following description will be made with attention directed to the differences.

Processing performed by a sensor system according to the background art in relation to the present embodiment is identical to the processing performed by the sensor system according to the background art in relation to the second embodiment as described with reference to FIG. 16. As with the host processor 7 according to the second embodiment, the host processor 7 according to the present embodiment is configured to use the pen state (a pen-up or a pen-down) reported from the sensor controllers 11a and 11b as the state of the stylus S.

FIG. 28 is a diagram illustrating an example (comparative example 4) of a result of performing the processing according to the background art in relation to the present embodiment. Movements of the stylus S according to the present comparative example are similar to those of the comparative example 3 illustrated in FIG. 24. As illustrated in FIG. 28, in the present comparative example, pen-up information is reported from the sensor controller 11a to the host processor 7 in response to the pen pressure value P becoming zero at times $t_7$ and $t_{16}$. As a result, the state of the stylus S which is internally possessed by the host processor 7 is the same as in the comparative example 3 of FIG. 24.

The host processor 7 is configured to end the processing related to the stylus S after waiting for a certain time rather than immediately ending the processing related to the stylus S while the position (x, y) and the like are not supplied from the sensor controllers 11a and 11b at times $t_9$ and $t_{10}$. However, in the present comparative example, pairing is once canceled at time $t_9$, and as a result, the position (x, y)

and the like supplied at and after time $t_{11}$ are associated with a local ID different from a local ID thus far. Thus, the host processor 7 processes stroke data up to time $t_5$, and stroke data at and after time $t_{11}$, as stroke data drawn by different styluses S.

Here, the third embodiment prevents the occurrence of a pen-up when the pen tip of the stylus S is located between the screens by changing the output content of the pen pressure value P or stopping the output of the pen pressure value P. Because the processing of the host processor 7 is different in the present embodiment, the occurrence of a pen-up when the pen tip of the stylus S is located between the screens cannot be prevented by the same method as in the third embodiment. Accordingly, the sensor system according to the present embodiment prevents the occurrence of a pen-down when the pen tip is located outside the effective regions R1a and R1b by stopping the output of the pen state from the sensor controllers 11a and 11b. On the other hand, the processing of delaying pairing cancellation for a certain time when the pen tip of the stylus S is located between the screens is performed in a similar manner to the third embodiment. Description will be made in detail in the following.

Figure 29:
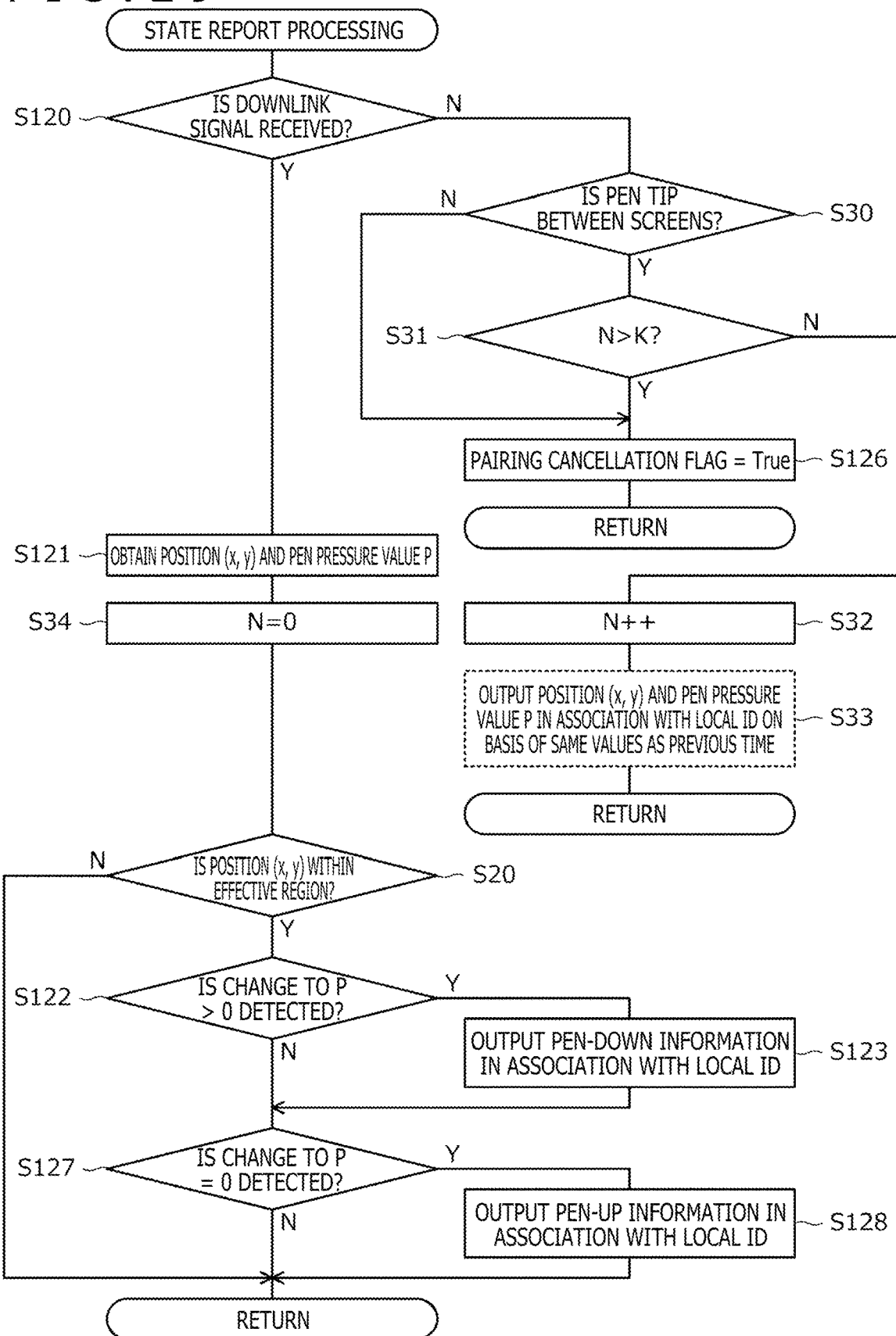
FIG. 29 is a diagram illustrating state report processing performed by a sensor system according to the fourth embodiment of the present invention.

FIG. 29 is a diagram illustrating state report processing performed by the sensor system according to the present embodiment. As is understood from comparison of FIG. 29 with FIG. 25, processing after it is determined in step S120 that no downlink signal is received is similar to the processing illustrated in FIG. 25 except that step S125, which outputs pen-up information, is not included. In addition, after it is determined in step S120 that a downlink signal is received, step S34 is performed together with step S121, as in FIG. 25. Hence, with the sensor system according to the present embodiment, the execution of pairing cancellation is delayed by an amount corresponding to the number of times defined by the predetermined value K.

In addition, as is understood from comparison of FIG. 29 with FIG. 19, processing after step S34 is similar to the processing of the sensor system according to the second embodiment as illustrated in FIG. 19. Hence, with the sensor system according to the present embodiment, when the position (x, y) is not a position within the effective region R1a or R1b, the pen state is not reported from the sensor controllers 11a and 11b to the host processor 7.

Figure 30:
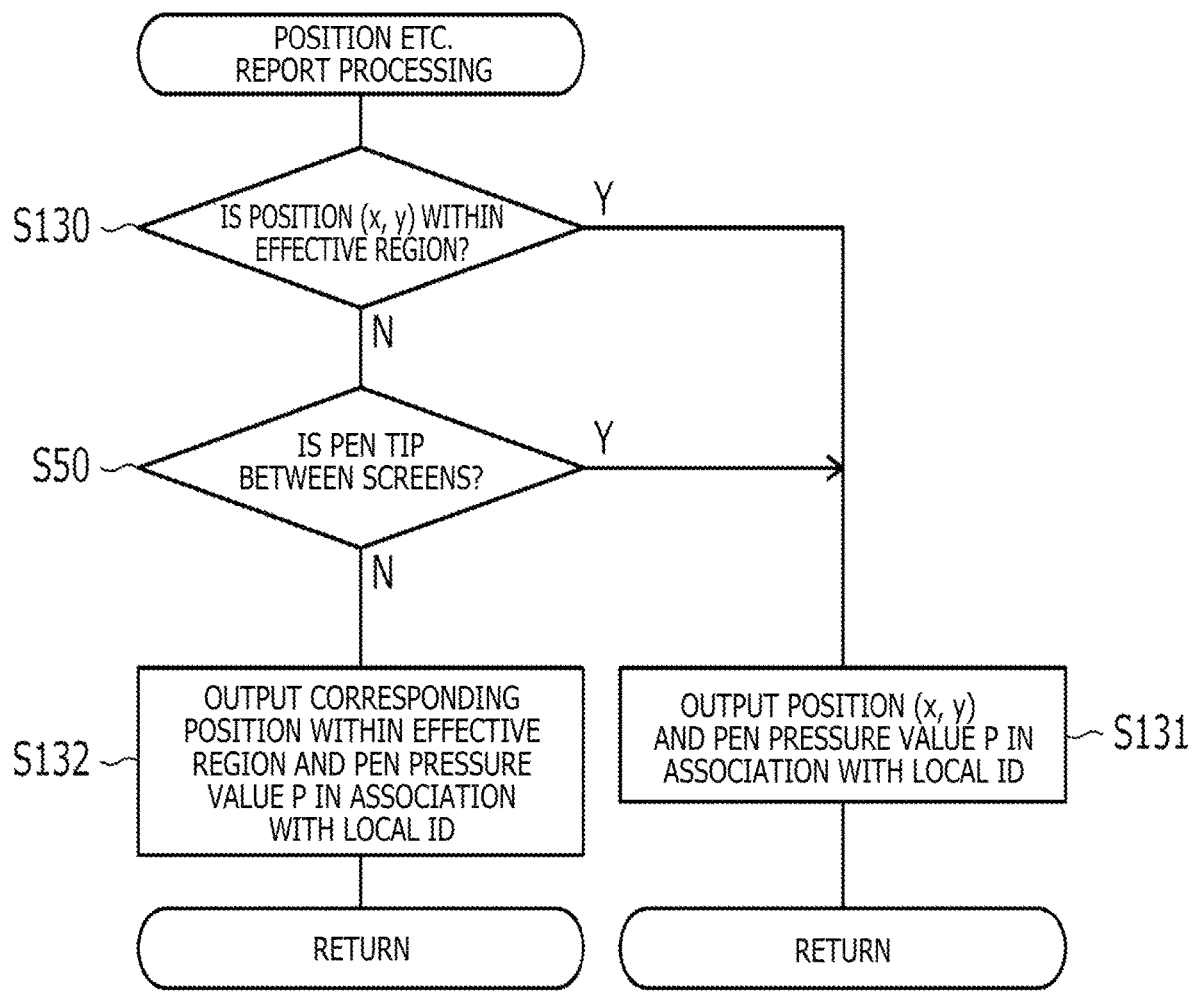
FIG. 30 is a diagram illustrating position etc. report processing performed by the sensor system according to the fourth embodiment of the present invention.

FIG. 30 is a diagram illustrating position etc. report processing performed by the sensor system according to the present embodiment. As is understood from comparison of FIG. 30 with FIG. 6B, the position etc. report processing performed by the sensor system according to the present embodiment is obtained by adding step S50 to the processing of FIG. 6B.

As with step S30 illustrated in FIG. 25 and step S40 illustrated in FIG. 26, step S50 is the processing of determining whether or not the pen tip of the stylus S is located in a region between the screens of the display 3a and the display 3b (between the panel surfaces). The sensor system according to the present embodiment makes the determination of step S50 when determining in step S130 that the position (x, y) is not a position within the effective region R1a or R1b. Then, when the sensor system determines in step S50 that the pen tip of the stylus S is located between the screens, the sensor system performs the processing of step S131. When the sensor system determines in step S50 that the pen tip of the stylus S is not located between the screens, the sensor system performs the processing of step S132. Thus, when the pen tip of the stylus S is located between the screens, the processing of replacing the position (x, y) with the corresponding position within the effective region R1a or R1b is not performed.

Figure 31:
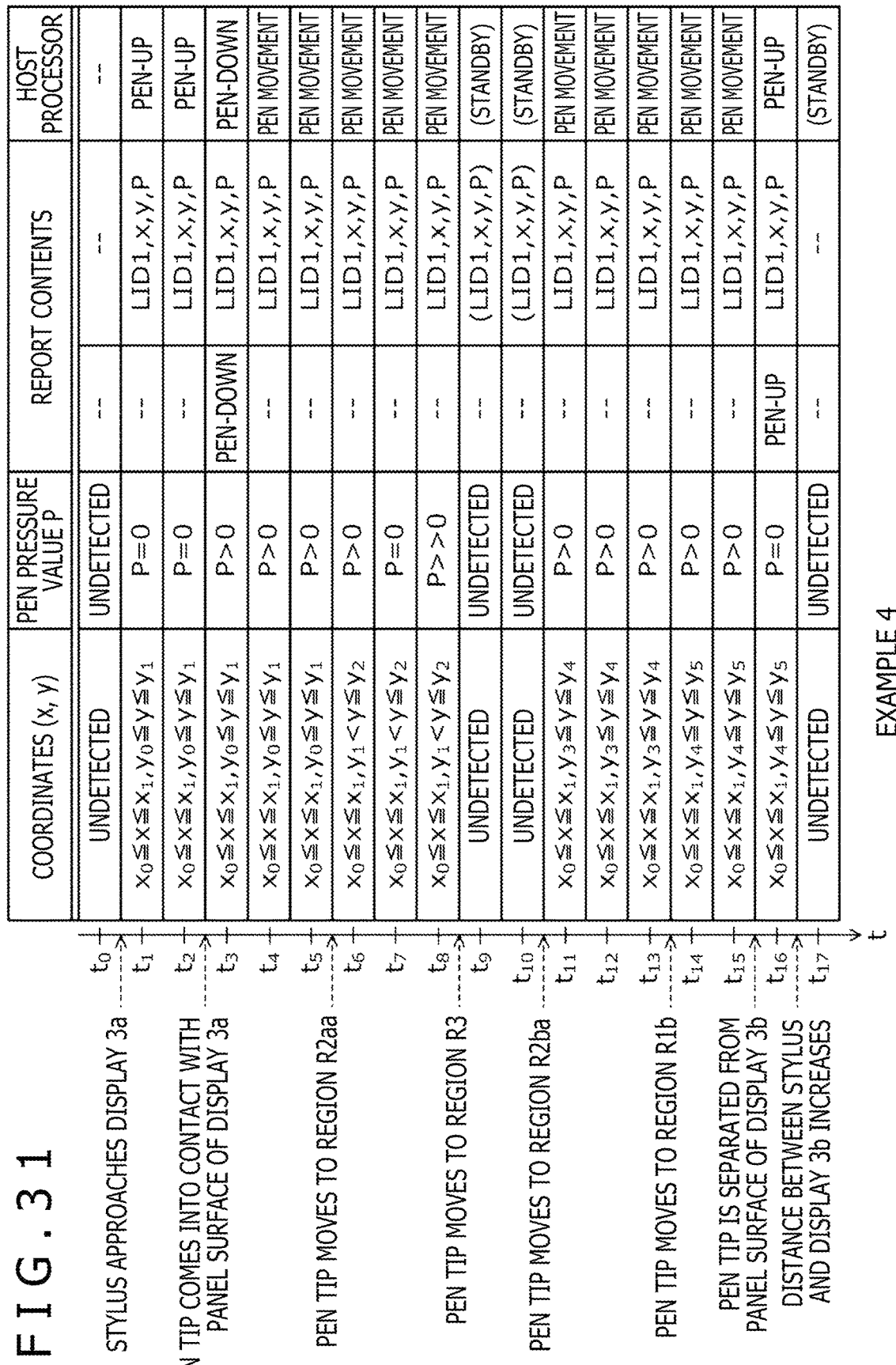
FIG. 31 is a diagram illustrating example (example 4) of a result of performing the processing according to the fourth embodiment of the present invention, wherein such processing is illustrated in FIG. 29 and FIG. 30.

FIG. 31 is a diagram illustrating an example (example 4) of a result of performing the processing according to the present embodiment as illustrated in FIG. 29 and FIG. 30. Movements of the stylus S in the present example are identical to those of the comparative example 4 illustrated in FIG. 28. As illustrated in FIG. 31, according to the present embodiment, the pen state is not output from the sensor controllers 11a and 11b to the host processor 7 during a period from time $t_6$ to time $t_{13}$ during which the pen tip of the stylus S is located outside the effective regions R1a and R1b. In addition, pairing is not canceled even at times $t_9$ and $t_{10}$ at which the pen tip of the stylus S is located within the non-sensitive region R3. The local ID is therefore maintained after the passage of time $t_{10}$. Hence, the host processor 7 maintains the state of pen movement during a period from time $t_6$ to time $t_{13}$. The stroke data ST illustrated in FIG. 23 is therefore prevented from being broken between the displays 3a and 3b.

As described above, the sensor system according to the present embodiment also does not generate a pen-up and does not cancel pairing when the pen tip of the stylus S is located between the screens. It is therefore possible to draw one line that straddles the displays 3a and 3b.

The sensor system according to the present embodiment also can supply the host processor 7 with coordinates within the specific detectable regions R2aa and R2ba rather than the corresponding positions within the effective regions R1a and R1b while the pen tip of the stylus S is located within the specific detectable regions R2aa and R2ba, and also continue outputting the position (x, y) and the pen pressure value P while the pen tip of the stylus S is located within the non-sensitive region R3. The stroke data straddling the displays 3a and 3b can therefore be generated smoothly.

Also with the sensor system according to the present embodiment, as for a region other than between the screens, as in the second embodiment and the like, a pen-down can be prevented from occurring against the user's will when the pen tip of the stylus S is located outside the effective region R1. It is therefore possible to prevent the occurrence of an erroneous operation caused by an obstacle such as a level difference or a groove present within the detectable regions R2a and R2b, such as an erroneous tapping of the "close" button displayed at edges of the displays 3a and 3b and the like.

Also in the present embodiment, as described in the third embodiment, processing such as changing the output content of the pen pressure value P or stopping the output of the pen pressure value P may be performed when the pen tip is located outside the effective regions R1a and R1b.

Preferred embodiments of the present invention have been described above. However, the present invention is not limited to such embodiments, and the present invention can be carried out in various modes without departing from the spirit of the present invention.

What is claimed is:

1. A sensor system that detects a stylus on at least one panel surface having an effective region, the sensor system comprising:
   a memory device including computer-executable instructions; and
   a processor which, when loaded with the computer-executable instructions, performs:
      obtaining a position of the stylus and a pen pressure value indicating a pressure applied to a pen tip of the stylus;

outputting the position and the pen pressure value to a host processor;

in response to the position being outside the effective region, concealing from the host processor occurrence of at least one of a pen-down indicating the stylus contacting the panel surface and a pen-up indicating the stylus being removed from the panel surface; and in response to the position being outside the effective region, after the pen pressure value becomes a noncontact value indicating that the stylus is not in contact with the panel surface, preventing outputting of the pen pressure value until the position returns to an inside of the effective region.

2. The sensor system according to claim 1, wherein the processor performs:

in response to the position being outside the effective region, after the pen pressure value becomes the noncontact value indicating that the stylus is not in contact with the panel surface, outputting the noncontact value in place of the obtained pen pressure value until the position returns to the inside of the effective region.

3. The sensor system according to claim 1, wherein the processor performs:

in response to the position being outside the effective region, after the pen pressure value becomes the noncontact value indicating that the stylus is not in contact with the panel surface, preventing outputting of the position and of the pen pressure value to the host processor until the position returns to the inside of the effective region.

4. The sensor system according to claim 1, wherein the processor performs:

in response to the position being outside the effective region, after the pen pressure value changes from a first value indicating the stylus contact with the panel surface to a second value indicating the stylus noncontact with the panel surface, outputting the first value in place of the obtained pen pressure value until the position returns to the inside of the effective region.

5. The sensor system according to claim 1, wherein the processor performs:

in response to detection of a change in the pen pressure value to a value indicating the stylus contact with the panel surface, outputting information indicative of the pen-down to the host processor; and in response to the position being outside the effective region, not outputting the information indicative of the pen-down to the host processor.

6. The sensor system according to claim 5, wherein the processor performs:

in response to detection of a change in the pen pressure value to a value indicating the stylus noncontact with the panel surface, outputting information indicative of the pen-up to the host processor; and in response to the position being outside the effective region, not outputting the information indicative of the pen-up to the host processor.

7. The sensor system according to claim 1, wherein the processor performs:

in response to the position being outside the effective region, outputting a replacement position within the effective region corresponding to the obtained position to the host processor in place of the obtained position.

8. The sensor system according to claim 1, comprising a first display and a second display each having a panel surface, wherein the processor performs:

receiving a downlink signal transmitted by the stylus;

in response to non-reception of the downlink signal, outputting information indicative of the pen-up to the host processor;

determining whether or not the stylus is located in a region between the panel surfaces of the first display and the second display; and in response to determining that the stylus is located in the region between the panel surfaces, not outputting the information indicative of the pen-up to the host processor for a defined period of time.

9. The sensor system according to claim 8, wherein the processor performs:

in response to the non-reception of the downlink signal, canceling pairing with the stylus; and in response to determining that the stylus is located in the region between the panel surfaces, not canceling the pairing with the stylus for the defined period of time.

10. The sensor system according to claim 8, wherein the processor performs:

in response to the position being outside the effective region, after the pen pressure value becomes the noncontact value indicating that the stylus is not in contact with the panel surface, outputting the noncontact value in place of the obtained pen pressure value until the position returns to the inside of the effective region.

11. The sensor system according to claim 8, wherein the processor performs:

in response to the position being outside the effective region, after the pen pressure value becomes the noncontact value indicating that the stylus is not in contact with the panel surface, preventing outputting of the position and of the pen pressure value to the host processor until the position returns to the inside of the effective region.

12. The sensor system according to claim 8, wherein the processor performs:

in response to the position being outside the effective region, after the pen pressure value changes from a first value indicating the stylus contact with the panel surface to a second value indicating the stylus noncontact with the panel surface, outputting the first value in place of the obtained pen pressure value until the position returns to the inside of the effective region.

13. The sensor system according to claim 8, wherein the processor performs:

in response to the non-reception of the downlink signal, outputting, to the host processor, the position and the pen pressure value previously output to the host processor.

14. The sensor system according to claim 1, comprising a first display and a second display each having an effective region, wherein the processor performs:

receiving a downlink signal transmitted by the stylus;

in response to non-reception of the downlink signal, canceling pairing with the stylus;

determining whether or not the stylus is located in a region between panel surfaces of the first display and the second display; and in response to determining that the stylus is located in the region between the panel surfaces, not canceling the pairing with the stylus for a defined period of time.

15. The sensor system according to claim 14, wherein the processor performs:

in response to detection of a change in the pen pressure value to a value indicating the stylus noncontact with the panel surface, outputting information indicative of the pen-up to the host processor; and in response to the position being outside the effective region, not outputting the information indicative of the pen-up to the host processor.

16. The sensor system according to claim 15, wherein the processor performs:

in response to detection of a change in the pen pressure value to a value indicating the stylus contact with the panel surface, outputting information indicative of the pen-down to the host processor; and in response to the position being outside the effective region, not outputting the information indicative of the pen-down to the host processor.

17. The sensor system according to claim 14, wherein the processor performs:

in response to the non-reception of the downlink signal, outputting, to the host processor, the position and the pen pressure value previously output to the host processor.

* * * * *